United States Patent
Lee et al.

(10) Patent No.: US 10,122,515 B2
(45) Date of Patent: Nov. 6, 2018

(54) METHOD FOR SHARING RADIO RESOURCE INFORMATION IN MULTI-CELL WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Jonghyun Park, Anyang-si (KR); Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 14/758,454

(22) PCT Filed: Dec. 30, 2013

(86) PCT No.: PCT/KR2013/012387
§ 371 (c)(1),
(2) Date: Jun. 29, 2015

(87) PCT Pub. No.: WO2014/104854
PCT Pub. Date: Jul. 3, 2014

(65) Prior Publication Data
US 2015/0333893 A1 Nov. 19, 2015

Related U.S. Application Data

(60) Provisional application No. 61/747,361, filed on Dec. 30, 2012, provisional application No. 61/748,767, (Continued)

(51) Int. Cl.
*H04B 7/04* (2017.01)
*H04L 1/00* (2006.01)
(Continued)

(52) U.S. Cl.
CPC ......... *H04L 5/0057* (2013.01); *H04B 7/0417* (2013.01); *H04B 7/0486* (2013.01);
(Continued)

(58) Field of Classification Search
CPC ..... H04L 1/0026; H04L 1/0031; H04L 5/001; H04L 5/0032; H04L 5/0048;
(Continued)

(56) References Cited

U.S. PATENT DOCUMENTS 9,210,602 B2 * 12/2015 Mondal ................ H04W 24/08
9,264,915 B2 * 2/2016 Seo ...................... H04B 7/0626
(Continued)

FOREIGN PATENT DOCUMENTS

CN  102204141 A  9/2011
CN  104662813 A  5/2015
(Continued)

OTHER PUBLICATIONS

Catt, "Discussion on evaluation of Interference Measurement for CoMP CSI feedback," 3GPP TSG-RAN WG4 Meeting #64bis, R4-125379, Santa Rosa, CA,US, Oct. 8-12, 2012, 2 pgs.
(Continued)

*Primary Examiner* — Eric Nowlin
(74) *Attorney, Agent, or Firm* — Birch, Stewart, Kolasch & Birch, LLP

(57) ABSTRACT

The present invention relates to a method and an apparatus for reporting channel state information of user equipment in a multi-cell wireless communication system. More particularly, the present invention comprises the steps of: receiving from a serving cell information on interference measurement resources (IMR) linked to at least one channel state information process (CSI process) and at least one item of CSI measurement information with respect to a plurality of radio resource sets having different interference characteristics;
(Continued)

and reporting channel state information with respect to a specific radio resource set according to at least one item of information on the IMR and the at least one item of CSI measurement information, wherein the radio resource sets are defined so that uplink-downlink status changes depending on a system load state, and are linked to different channel state estimation processes.

6 Claims, 16 Drawing Sheets

Related U.S. Application Data filed on Jan. 4, 2013, provisional application No. 61/750,343, filed on Jan. 8, 2013, provisional application No. 61/803,114, filed on Mar. 18, 2013.

(51) Int. Cl.
| | |
|---|---|
| H04L 5/00 | (2006.01) |
| H04W 16/24 | (2009.01) |
| H04W 72/08 | (2009.01) |
| H04B 7/0456 | (2017.01) |
| H04B 7/0417 | (2017.01) |

(52) U.S. Cl.
CPC .......... *H04L 1/0026* (2013.01); *H04L 5/0032* (2013.01); *H04L 5/0053* (2013.01); *H04W 16/24* (2013.01); *H04W 72/085* (2013.01); *H04L 1/0031* (2013.01); *H04L 5/0048* (2013.01)

(58) Field of Classification Search
CPC ... H04L 5/0053; H04L 5/0057; H04L 5/1469; H04L 5/0005; H04L 5/0023; H04L 5/0035; H04L 5/005; H04L 5/0051; H04L 5/0073; H04L 5/0094; H04W 16/24; H04W 24/10; H04W 72/0413; H04W 72/042; H04W 72/0446; H04W 72/085; H04W 74/004; H04B 7/0417; H04B 7/0486; H04B 7/0626; H04B 7/0632; H04B 7/0639

See application file for complete search history.

(56) References Cited

U.S. PATENT DOCUMENTS

| | | | | |
|---|---|---|---|---|
| 9,408,097 | B2* | 8/2016 | Mondal | H04W 24/08 |
| 9,456,372 | B2* | 9/2016 | Lee | H04L 25/0226 |
| 9,467,881 | B2* | 10/2016 | Seo | H04J 11/00 |
| 9,537,638 | B2* | 1/2017 | Geirhofer | H04L 5/0057 |
| 9,667,391 | B2* | 5/2017 | Lee | H04L 1/0026 |
| 9,742,537 | B2* | 8/2017 | Suzuki | H04W 24/10 |
| 9,775,135 | B2* | 9/2017 | Seo | H04W 72/0406 |
| 9,787,383 | B2* | 10/2017 | Seo | H04B 7/0626 |
| 9,872,303 | B2* | 1/2018 | Suzuki | H04W 72/085 |
| 9,986,454 | B2* | 5/2018 | Lee | H04W 24/08 |
| 2004/0219926 | A1 | 11/2004 | Kim et al. | |
| 2011/0110251 | A1 | 5/2011 | Krishnamurthy et al. | |
| 2012/0257524 | A1* | 10/2012 | Chen | H04W 24/10 370/252 |
| 2012/0300641 | A1* | 11/2012 | Chen | H04L 1/0026 370/241 |
| 2013/0107832 | A1* | 5/2013 | Kim | H04B 7/024 370/329 |
| 2013/0194982 | A1* | 8/2013 | Fwu | H04W 72/085 370/280 |
| 2013/0301450 | A1* | 11/2013 | Geirhofer | H04B 7/024 370/252 |
| 2013/0301465 | A1* | 11/2013 | Seo | H04B 7/0626 370/252 |
| 2013/0336214 | A1* | 12/2013 | Sayana | H04B 7/024 370/328 |
| 2014/0022988 | A1* | 1/2014 | Davydov | H04B 7/024 370/328 |
| 2014/0036706 | A1* | 2/2014 | Mondal | H04W 24/08 370/252 |
| 2014/0064203 | A1* | 3/2014 | Seo | H04W 28/06 370/329 |
| 2014/0071848 | A1 | 3/2014 | Park et al. | |
| 2014/0078990 | A1* | 3/2014 | Lee | H04L 1/0026 370/329 |
| 2014/0126433 | A1* | 5/2014 | Yang | H04L 5/001 370/280 |
| 2014/0126496 | A1* | 5/2014 | Sayana | H04B 7/024 370/329 |
| 2014/0269453 | A1* | 9/2014 | Papasakellariou | H04B 7/2643 370/280 |
| 2014/0269460 | A1* | 9/2014 | Papasakellariou | H04L 5/1469 370/294 |
| 2014/0321313 | A1* | 10/2014 | Seo | H04J 11/00 370/252 |
| 2014/0321407 | A1* | 10/2014 | Seo | H04B 7/0626 370/329 |
| 2014/0369244 | A1* | 12/2014 | Han | H04W 52/0258 370/280 |
| 2015/0200754 | A1* | 7/2015 | Sayana | H04B 7/024 370/329 |
| 2015/0215090 | A1* | 7/2015 | Sayana | H04B 7/024 370/329 |
| 2015/0289211 | A1* | 10/2015 | Lee | H04W 52/16 370/328 |
| 2015/0333893 | A1* | 11/2015 | Lee | H04L 1/0026 370/252 |
| 2015/0358139 | A1* | 12/2015 | Li | H04W 72/08 370/252 |
| 2015/0358847 | A1* | 12/2015 | Takahashi | H04W 24/10 370/252 |
| 2016/0050578 | A1* | 2/2016 | Mondal | H04W 24/08 370/252 |
| 2016/0050648 | A1* | 2/2016 | Seo | H04B 7/0626 370/329 |
| 2016/0073392 | A1* | 3/2016 | Byun | H04W 72/048 370/280 |
| 2016/0135070 | A1* | 5/2016 | Lee | H04L 5/0053 370/252 |
| 2016/0142188 | A1* | 5/2016 | Suzuki | H04W 24/10 370/329 |
| 2016/0143044 | A1* | 5/2016 | Suzuki | H04W 72/1226 370/329 |
| 2016/0197687 | A1* | 7/2016 | Song | H04L 5/00 370/252 |
| 2016/0227424 | A1* | 8/2016 | Chen | H04W 24/08 |
| 2016/0242054 | A1* | 8/2016 | Lee | H04B 17/345 |
| 2016/0255608 | A1* | 9/2016 | Park | H04L 5/0087 |
| 2016/0269104 | A1* | 9/2016 | Lee | H04B 7/2656 |
| 2017/0318568 | A1* | 11/2017 | Nimbalker | H04L 5/0048 |
| 2018/0091992 | A1* | 3/2018 | Frenne | H04W 24/10 |

FOREIGN PATENT DOCUMENTS

| | | |
|---|---|---|
| EP | 2869478 A1 | 5/2015 |
| KR | 10-2004-0093994 A | 11/2004 |
| KR | 10-2012-0087167 A | 8/2012 |
| WO | WO 2012/096532 A2 | 7/2012 |
| WO | WO 2012/141421 A1 | 10/2012 |
| WO | WO 2012/144842 A2 | 10/2012 |
| WO | WO 2014/051323 A1 | 4/2014 |

OTHER PUBLICATIONS

Huawei et al. "Discussion on IMR collision randomization," 3GPP TSG RAN WG1 Meeting #70bis, R1-124073, San Diego, USA, Oct. 8-12, 2012, 7 pgs.

(56) References Cited

OTHER PUBLICATIONS

Huawei et al., "Way Forward on IMR Collisions Randomization," 3GPP TSG RAN WG1 #70bis, R1-124612, San Diego, USA, Oct. 8-12, 2012, 7 pgs.

Huawei et al., "Consideration on CSI tests for DL CoMP," 3GPP TSG-RAN WG4 #65, R4-126155, New Orleans, USA, Nov. 12-16, 2012, 6 pgs.

3GPP. "LTE; Evolved Universal Terrestrial Radio Access (E-UTRA); Physical layer procedures (3GPP TS 36.213 version 11.1.0 Release 11)," ETSI TS 136 213 V11.1.0, Feb. 2013, pp. 1-161 (162 pages total).

Ericsson et al., "Interference control in dynamic TDD scenarios," 3GPP TSG-RAN WG1 #72, R1-130556, St Julian's, Maita, Jan. 26-Feb. 1, 2013, 2 pages.

Ericsson et al., "On CSI enhancements for Dynamic TDD," 3GPP TSG-RAN WG1 #72bis, R1-131456, Chicago, USA, Apr. 15-19, 2013, 3 pages.

Huawei et al., "Interference mitigation schemes for TDD eIMTA," 3GPP TSG RAN WG1 Meeting #72, R1-130015, St Julian's, Maita, Jan. 28-Feb. 1, 2013, 5 pages.

LG Electronics, "Additional Issues on TDD UL-DL Reconfiguration," 3GPP TSG RAN WG1 Meeting #72bis, R1-131293, Chicago, USA, Apr. 15-19, 2013, pp. 1-4.

LG Electronics, "Considerations on TDD UL-DL reconfigurations," 3GPP TSG RAN WG1 Meeting #72, R1-130262, St Julian's, Maita, Jan. 28-Feb. 1, 2013, pp. 1-4.

LG Electronics, "TDD DL-UL Reconfiguration Methods for eIMTA," 3GPP TSG RAN WG1 Meeting #69, R1-122316, Prague, Czech Republic, May 21-25, 2012, pp. 1-5.

Renesas Mobile Europe LTD, "Discussions on interference mitigation schemes for TDD UL-DL reconfiguration," 3GPP TSG RAN WG1 Meeting #72, R1-130419, St Julian's, Maita, Jan. 28-Feb. 1, 2013, 5 pages.

Huawei et al., "Signaling and UE Behaviors for Resource-Specific CSI Measurements," R1-105852, 3GPP TSG RAN WG1 meeting #63, Jacksonville, USA, Nov. 15-19, 2010, 4 pages.

\* cited by examiner

FIG. 2
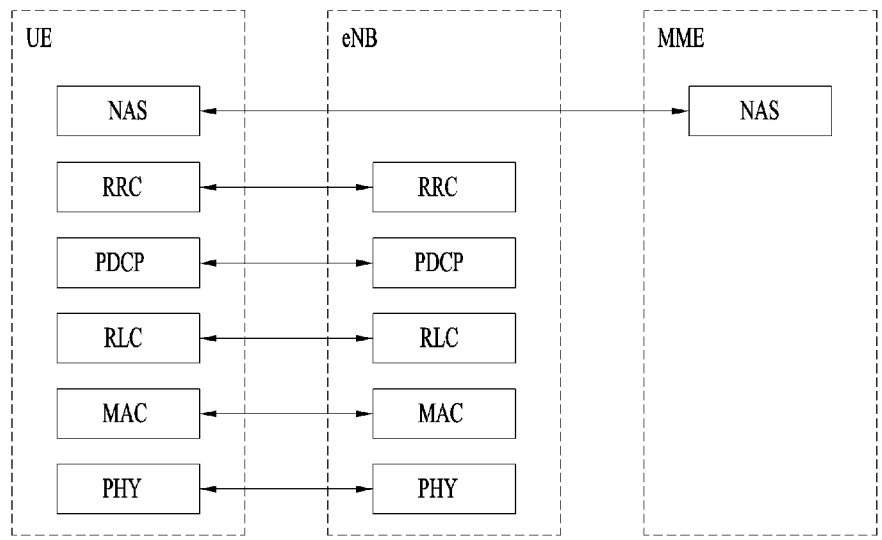
(A) CONTROL-PLANE PROTOCOL STACK
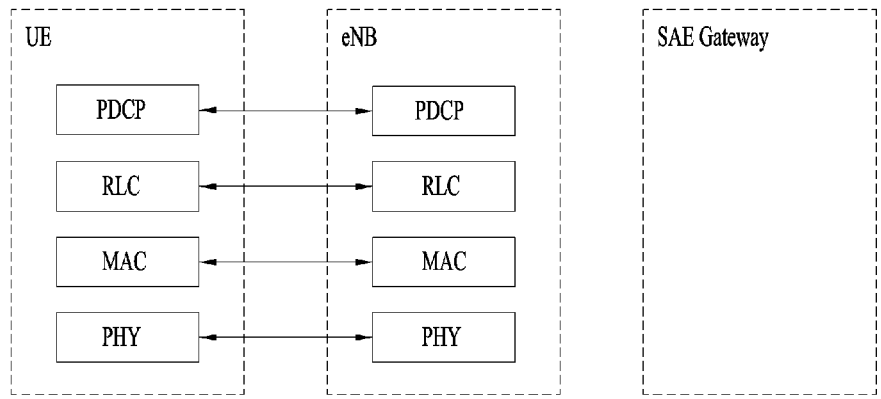
(B) USER-PLANE PROTOCOL STACK

▨ WHEN UL SF IS CHANGED TO USE OF DL (DL SF) AND USED

▨ WHEN UL SF IS CHANGED TO USE OF DL (DL SF) AND USED
⇔ INTERFERENCE BETWEEN RESOURCE IN SAME COMMUNICATION DIRECTION
⇔ INTERFERENCE BETWEEN RESOURCES IN DIFFERENT COMMUNICATION DIRECTIONS

[D] WHEN UL SF IS CHANGED TO USE OF DL (DL SF) AND USED
▨ Restricted CSI Measurement Set #A
☰ Restricted CSI Measurement Set #B
☐ POSITION OF SUBFRAME IN WHICH IMR IS CONFIGURED

▦ CRS  ▨ DM-RS  ⊠ IMR

FIG. 17
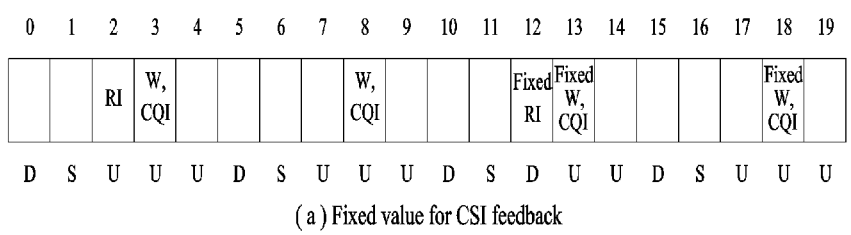
(a) Fixed value for CSI feedback
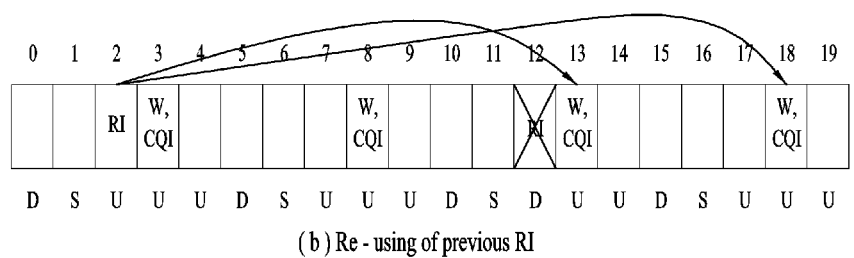
(b) Re-using of previous RI
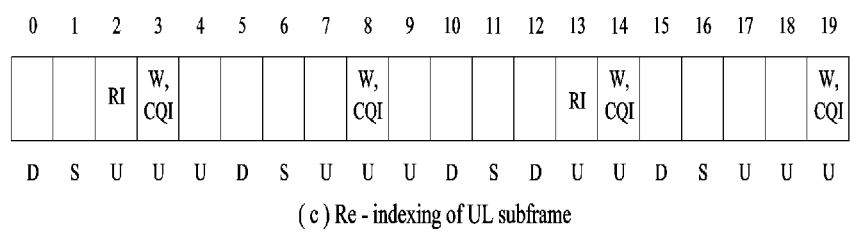
(c) Re-indexing of UL subframe FIG. 18
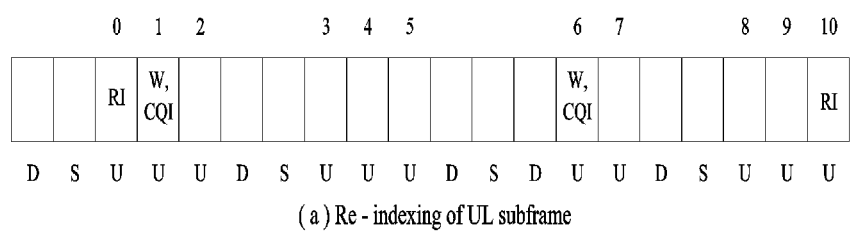
(a) Re-indexing of UL subframe
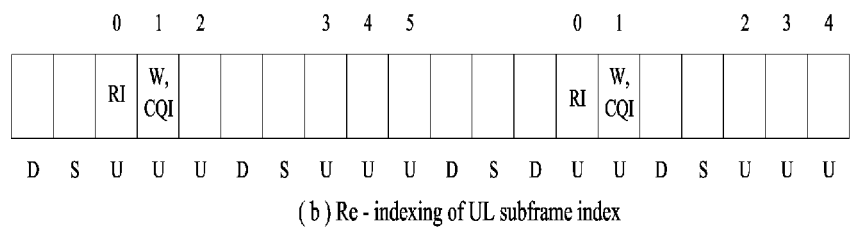
(b) Re-indexing of UL subframe index

METHOD FOR SHARING RADIO RESOURCE INFORMATION IN MULTI-CELL WIRELESS COMMUNICATION SYSTEM AND APPARATUS FOR SAME

CROSS REFERENCE TO RELATED APPLICATIONS

This application is the National Phase of PCT/KR2013/012387 filed on Dec. 30, 2013, which claims priority under 35 U.S.C. 119(e) to U.S. Provisional Application Nos. 61/747,361 filed on Dec. 30, 2012; 61/748,767 filed on Jan. 4, 2013; 61/750,343 filed on Jan. 8, 2013; and 61/803,114 filed on Mar. 18, 2013, all of which are hereby expressly incorporated by reference into the present application.

TECHNICAL FIELD

The present invention relates to a wireless communication system, and more particularly, to a method and apparatus for sharing radio resource information in a multi-cell wireless communication system.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method and apparatus for sharing radio resource information in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for reporting channel state information (CSI) of a user equipment (UE) of a multi-cell wireless communication system, the method including receiving information about interference measurement resources (IMRs) associated with at least one channel state estimation (CSI) process and at least one CSI measurement information item about a plurality of radio resource sets with different interference characteristics, from a serving cell, and reporting CSI about a specific radio resource set according to the at least one IMR information item and the at least one CSI measurement CSI measurement information item, wherein the radio resource sets are defined to change uplink (UL)-downlink (DL) according to a system load state and are associated with different channel state estimation processes.

The IMR information may further include offset applied to each of the radio resource sets.

The CSI may include at least one of a rank indicator, a channel quality indicator, and a precoding matrix index.

The at least one channel state estimation process may be configured to be emulated as a smaller number (N, N is an integer, M>N) than a number (M, M is an integer) of the at least one channel state estimation process to measure channel state information The CSI may be deduced based on reference UL-DL configuration.

A signal type for configuration of the channel state estimation process and a signal type for changing use of the radio resource set may be different.

The channel state estimation process may be configured via RRC signaling, and the signal for changing use of the radio resource set may be configured through a MAC signal or a physical channel signal.

A time point for configuration completion of the channel state estimation process and a time point for configuration completion of change in use of the radio resource set may be different.

In another aspect of the present invention, provided herein is a user equipment (UE) for reporting channel state information (CSI) in a multi-cell wireless communication system, the UE including a radio frequency unit and a processor, wherein the processor is configured to receive information about interference measurement resources (IMRs) associated with at least one channel state estimation (CSI) process and at least one CSI measurement information item about a plurality of radio resource sets with different interference characteristics, from a serving cell, and to report CSI about a specific radio resource set according to the at least one IMR information item and the at least one CSI measurement CSI measurement information item, and the radio resource sets are defined to change uplink (UL)-downlink (DL) according to a system load state and are associated with different channel state estimation processes.

Advantageous Effects

According to the present invention, efficient communication can be performed by sharing information about a corresponding radio resource when a radio resource is dynamically changed according to a system load in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a control plane and a user plane of a radio interface protocol between a user equipment and E-UTRAN based on the 3GPP radio access network standard;

FIGS. 16 and 17 are diagrams illustrating a dynamic changing operation of a resource for channel state information (CSI) report according to an embodiment of the present invention;

FIG. 18 is a diagram illustrating the case in which only available UL subframes are re-indexed to calculate a time point for reporting CSI such as RI information, PMI information, and CQI information;

BEST MODE

Figure 1:
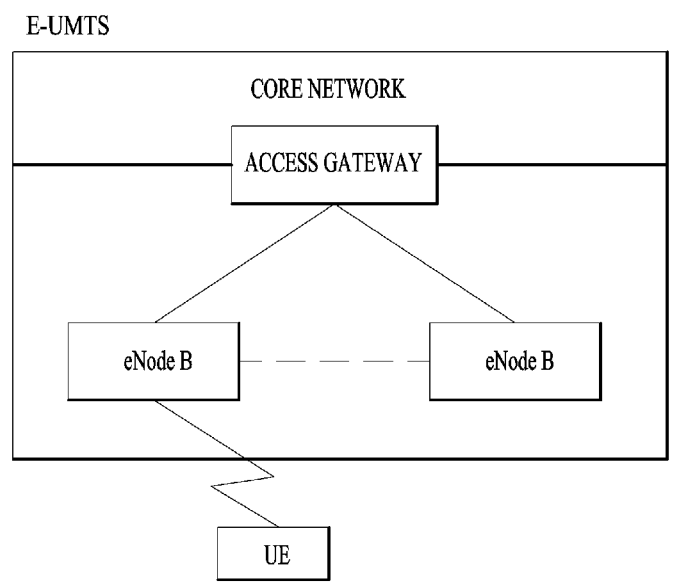
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
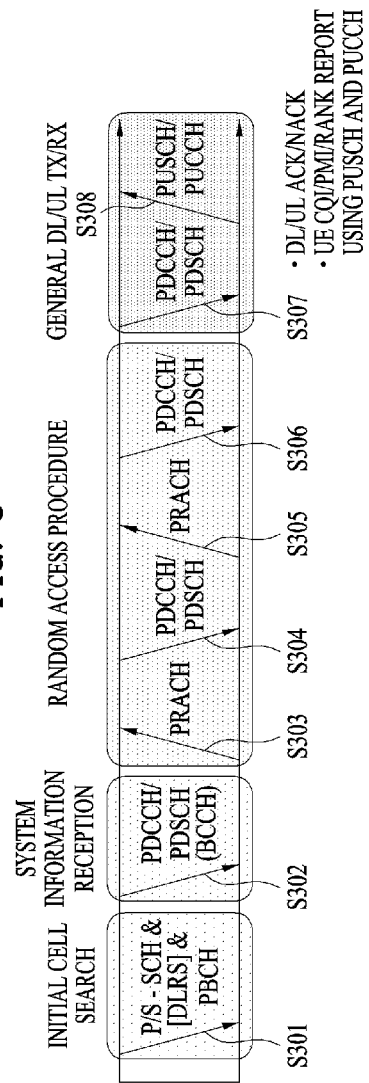
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
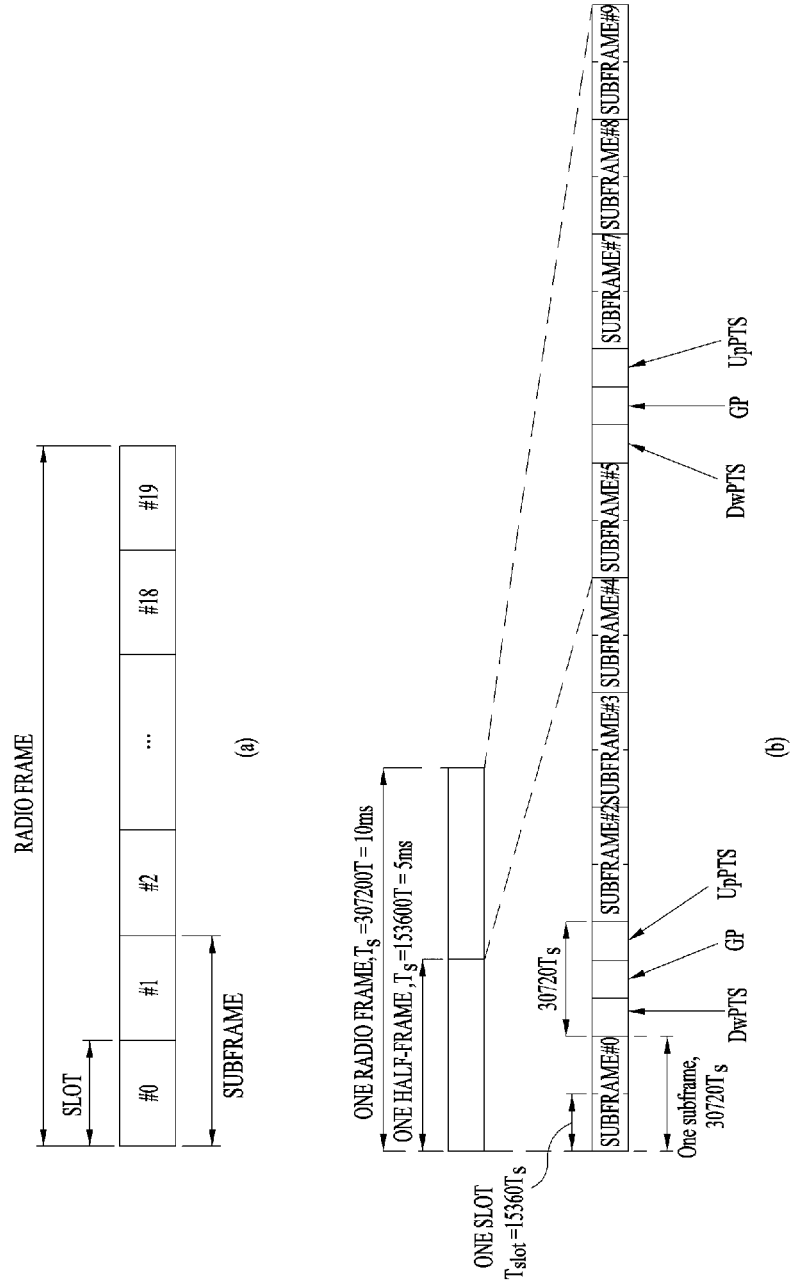
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/05000\times2048$), and the other region is configured for the guard period.

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
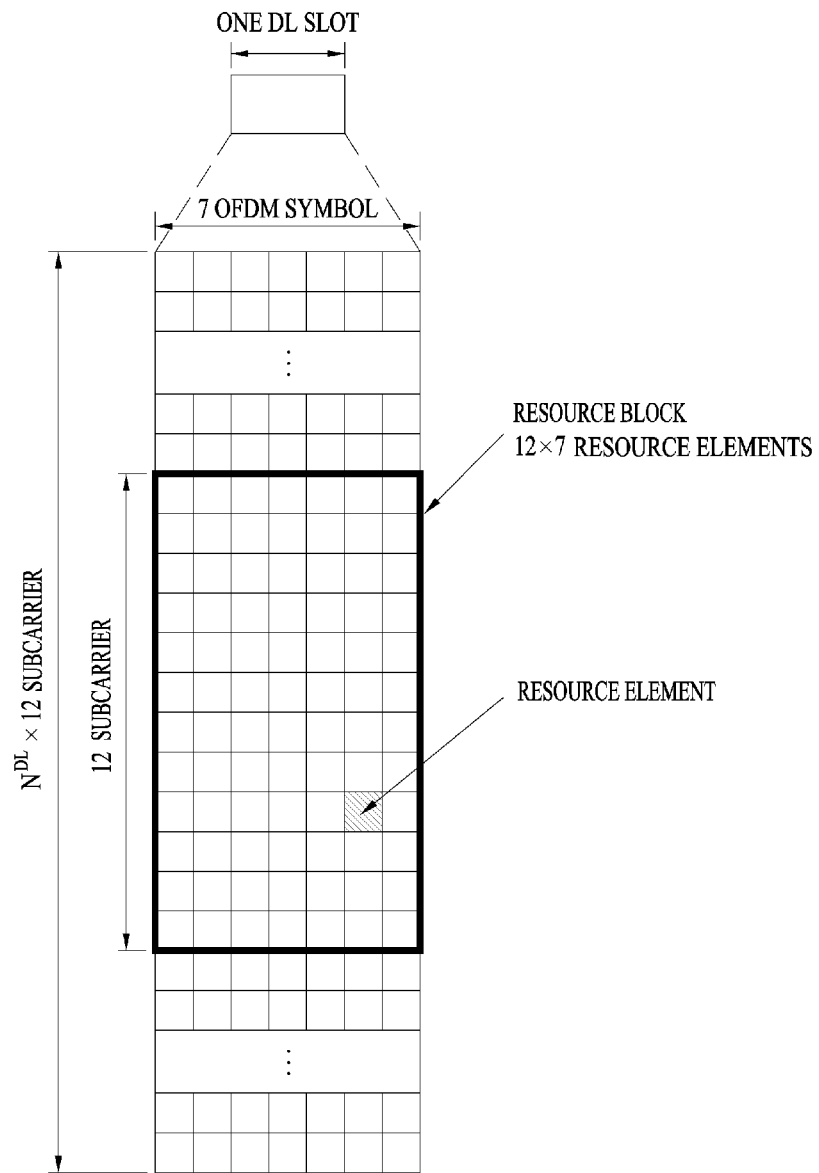
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes subcarriers, the downlink slot includes $N_{RB}^{DL} \times N_{sc}^{RB}$ subcarriers in the frequency domain.

Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
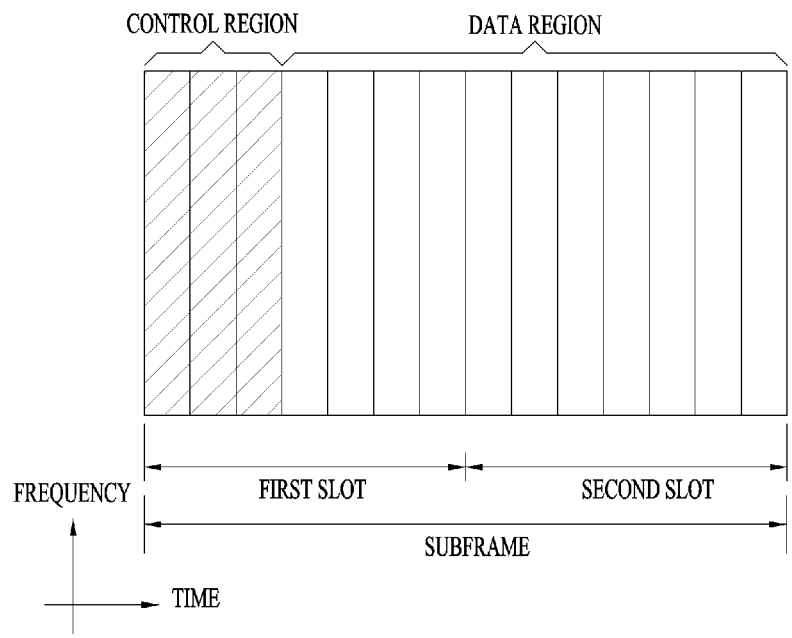
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
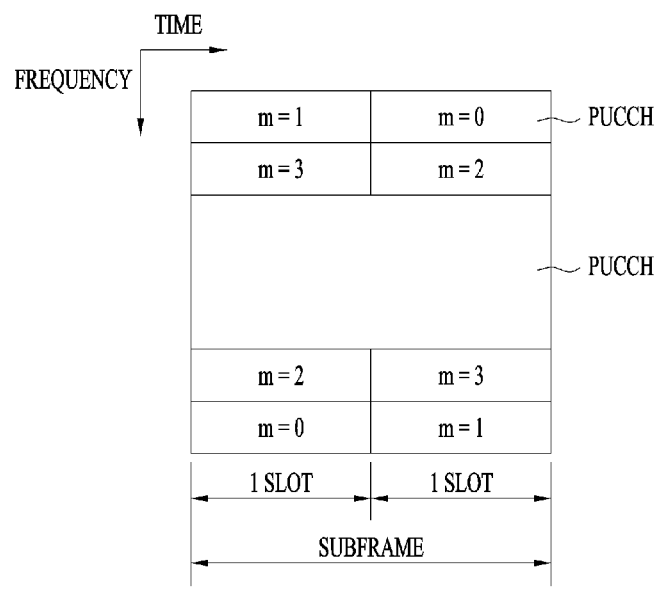
FIG. 7 is a diagram of an uplink subframe structure used in an LTE system.

FIG. 7 is a diagram of an uplink subframe structure used in an LTE system.

Referring to FIG. 7, an uplink subframe includes a plurality of slots (e.g. two slots). The slots may include different numbers of SC-FDMA symbols according to CP length. The uplink subframe is divided into a data region and a control region in the frequency domain. The data region includes a PUSCH and is used to transmit a data signal such as audio data. The control region includes a PUCCH and is used to transmit UCI. The PUCCH includes RB pairs located on both ends of the data region in the frequency domain and is hopped based on slots.

The PUCCH can be used to transmit the following control information.

Scheduling request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel state information (CSI): This is feedback information about a downlink channel. The CSI includes channel quality indicator (CQI) and feedback information regarding multiple input multiple output (MIMO) includes rank indicator (RI), precoding matrix indicator (PMI), precoding type indicator (PTI), etc. 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH.

Hereinafter, cooperative multipoint transmission/reception (CoMP) will be described.

An LTE-A post system attempts to enhance system performance by enabling inter-cell cooperation. This method is referred to as cooperative multipoint transmission/reception (CoMP). The CoMP refers to a method in which two or more eNBs, access points, or cells cooperate with each other to communicate with a UE in order to facilitate communication between a specific UE and an eNB, an access point, or a cell. In the present invention, an eNB, an access point, or a cell may be used with the same meaning.

In general, in a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

Figure 8:
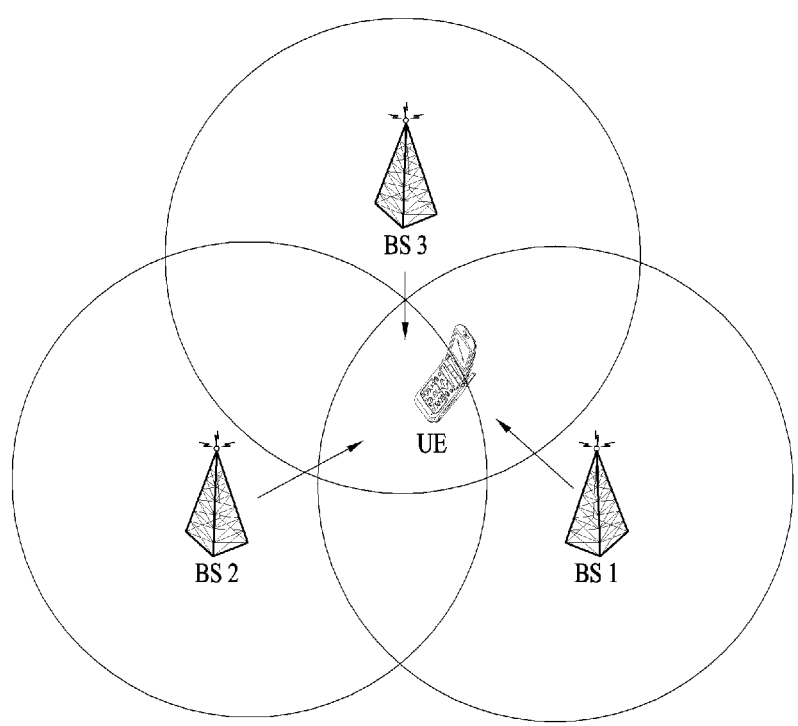
FIG. 8 is a diagram illustrating an example of CoMP.

FIG. 8 is a diagram illustrating an example of CoMP. Referring to FIG. 8, the wireless communication system includes a plurality of BSs BS1, BS2, and BS3 that perform CoMP and a UE. The plurality of BSs BS1, BS2, and BS3 that perform CoMP may cooperatively transmit data to the UE CoMP are classified largely into the following two schemes according to whether an eNB that performs the CoMP transmits data:

CoMP joint processing (CoMP-JP)
CoMP-CS/CB, CoMP cooperative scheduling (CoMP-CS)

According to the CoMP-JP, data to one UE may be simultaneously transmitted to a UE from each eNB that performs CoMP, and the UE may combines signals from eNBs to enhance reception performance. That is, the CoMP-JP scheme may use data from each point (eNB) of a CoMP cooperation unit. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, data transmitted to a single UE may be simultaneously transmitted from a plurality of transmission points. The joint transmission scheme can improve the quality of a received signal coherently or non-coherently and actively eliminate interference with other UEs, as well.

Dynamic cell selection is a technique of transmitting a PDSCH from one point (of a CoMP cooperation unit) at one time. That is, one point of the CoMP cooperation unit transmits data to a single UE at a given time point, while the other points of the CoMP cooperation unit do not transmit data to the UE at the time point. A transmission point to transmit data to a UE may be dynamically selected.

On the other hand, in the case of CoMP-CS, data to one UE may be transmitted to one eNB at an arbitrary time point and scheduling or beamforming is performed so as to minimize interference due to other eNBs. That is, according to the CoMP-CS/CB scheme, CoMP cooperation units may perform cooperative beamforming for data transmission to a single UE. Here, while only a serving cell transmits data to the UE, user scheduling/beamforming may be determined through coordination among cells of the corresponding CoMP cooperation unit.

Uplink CoMP reception refers to reception of an uplink signal through cooperation among a plurality of geographically separate points. Uplink CoMP schemes include Joint Reception (JR) and Coordinated Scheduling/Beamforming (CS/CB).

In JR, a plurality of reception points receives a signal transmitted on a PUSCH. CS/CB is a technique in which while only one point receives a PUSCH, user scheduling/beamforming is determined through coordination among cells of a CoMP cooperation unit.

Hereinafter, inter-cell interference will be described.

Like in a case in which two BSs (e.g., BS#1 and BS#2) are adjacently arranged, when coverage of two BSs partially overlaps with each other, one UE served from one BS may interfere by a strong DL signal from another one eNB.

Likewise, when inter-cell interference occurs, inter-cell interference may be reduced via an inter-cell cooperation signal method between two BSs. According to various embodiments of the present invention that will be described below, it is assumed that signals are smoothly transmitted and received between two BSs that interfere with each other. For example, it is assumed that a wireless/wired link (e.g., a backhaul link or a Un interface) with a good transmission condition such as a transmission bandwidth or delay is present between two BSs and thus the reliability of transmission and reception of a cooperation signal between BSs is high. In addition, it may be assumed that time synchronization between two BSs is matched within a permissible error limit (for example, when boundaries of DL subframes of two BSs that interfere with each other are aligned with each other) or the two BSs clearly recognize offset between subframe boundaries between the BSs.

Referring back to FIG. 8, BS#1 may be a macro eNB that serves a wide area with high transmission power and BS#2 may be a micro eNB (e.g., a pico eNB) that serves a narrow area with low transmission power. As illustrated in FIG. 8, when a UE that is positioned at a cell boundary region of BS#2 and served by BS#2 receive strong interference from BS#1, effective communication may be difficult without appropriate inter-cell cooperation.

In particular, when many UEs are connected to BS#2 as a micro eNB with low power such that BS#1 as a macro eNB distributes load for providing a service, the possibility that the above situation of inter-cell interference occurs is high. For example, in order to select a serving eNB, a UE may add a predetermine bias value to received power from the micro eNB and may not add a bias value to received power from the macro eNB so as to calculate and compare received power of DL signals from the respective eNBs, and thus the UE may select an eNB that provides highest DL received power as a serving eNB. Accordingly, as many as possible UEs may be connected to the micro eNB. Although intensity of a DL signal that is actually received by a UE is very high, the micro eNB may be selected as a serving eNB, and a UE connected to the micro eNB may experience strong experience from the macro eNB. In this case, when UEs positioned at a boundary of the micro eNB do not receive separate inter-cell cooperation, it may be difficult to perform an appropriate operation due to strong interference from the macro eNB.

Even if inter-cell interference is present, appropriate cooperation is also required between two eNBs that interfere with each other and signals for enabling the cooperation operation may be transmitted and received through a link between the two eNBs in order to perform an effective operation. In this case, when inter-cell interference occurs between the macro eNB and the micro eNB, the macro eNB may control an inter-cell cooperation operation and the micro eNB may perform an appropriate operation according to a cooperation operation according to a cooperation signal signaled by the macro eNB.

The aforementioned inter-cell interference situation is purely exemplary, and it would be obvious that embodiments of the present invention can also be applied to the case in which inter-cell interference occurs in other situations (for example, the case in which inter-cell interference occurs between a CSG method of HeNB and a OSG method of macro eNB, the case in which a micro eNB causes interference and a macro eNB receives interference, or the case in which inter-cell interference is present between micro eNBs or macro eNBs).

The present invention proposes a method of effectively estimating and reporting channel state information when use of a radio resource is dynamically changed according to a load state of a system based on the above description.

Hereinafter, for convenience of description, the present invention will be described in terms of a 3GPP LTE system. However, a scope of a system to which the present invention is applied can be extended to other systems other than a 3GPP LTE system. Embodiments of the present invention can also be extended to the case in which a resource on a specific cell or a specific component carrier (CC) is dynamically changed under an environment to which carrier aggregation (CA) is applied. In addition, the embodiments of the present invention can also be applied to the case in which use of a radio resource is dynamically changed under a TDD system or a FDD system.

Figure 9:
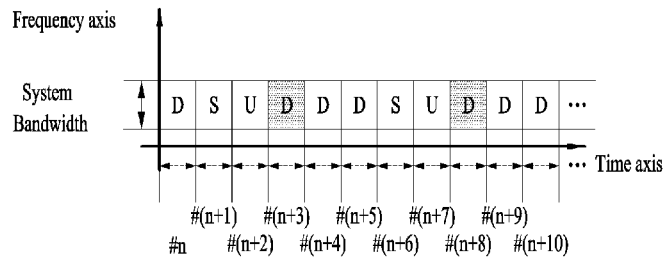
FIG. 9 is a diagram illustrating a case in which a specific cell changes and uses a portion of a legacy UL resource for DL communication under a TDD system environment.

FIG. 9 is a diagram illustrating a case in which a specific cell changes and uses a portion of a legacy UL resource (i.e., UL SF) for DL communication under a TDD system environment along with increase in DL loading amount of a system. As seen from FIG. 9, UL/DL configuration set through SIB is assumed to be UL-DL #1 (i.e., DSUUDDSUUD) and legacy UL SF #(n+3) and UL SF #(n+8) are changed and used for DL communication through a predefined signal (e.g., a physical/high layer signal or a system information signal).

Figure 10:
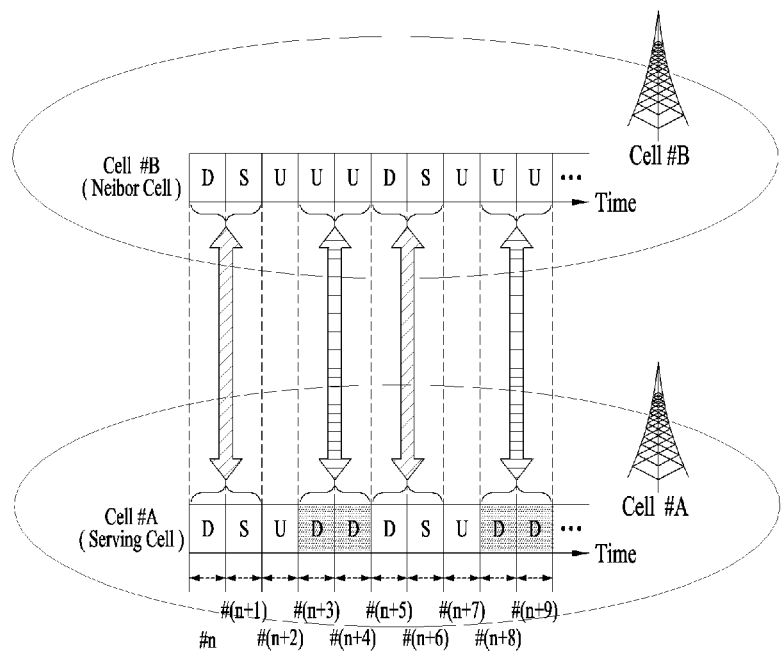
FIG. 10 is a diagram illustrating a case in which characteristics of interference received from outside are different for respective subframes (or subframes sets) despite resources used in the same DL communication direction with respect to a specific cell when cells dynamically change use of a legacy radio resource according to a system load of the corresponding cell under a TDD system environment.

FIG. 10 is a diagram illustrating a case in which characteristics of interference received from outside are different for respective subframes (or subframes sets) despite resources used in the same DL communication direction with respect to a specific cell when cells dynamically change use of a legacy radio resource according to a system load of the corresponding cell under a TDD system environment. Here, for convenience of description, it is assumed that two cells (i.e., cell #A and cell #B) are present in a network and UL/DL configuration set through SIB of separate cells is UL-DL#0 (i.e., DSUUUDSUUU). In FIG. 10, it is assumed that cell #A changes and uses legacy UL SF #(n+3), UL SF #(n+4), UL SF #(n+8), and UL SF #(n+9) for DL communication along with increase a DL loading amount of a system.

Accordingly, types of interferences received on a DL resource with respect to cell #A may be classified into interference between resources (i.e., SF #n, SF #(n+1), SF #(n+5), and SF #(n+6)) in the same communication direction and interference between resources (i.e., SF #(n+3), SF #(n+4), SF #(n+8), and SF #(n+9)) in different communication directions. Furthermore, the interference between resources in the same communication direction may be further classified into interference between resources having a DL communication direction as both directions of configuration on a SIB and current use and interference between resources having different configurations on a SIB and a DL communication direction as a direction of current use.

Likewise, the method for further classifying interference between resources with the same communication direction into a) interference between resources having a DL communication direction as both directions of configuration on a SIB and current use and b) interference between resources having different configurations on a SIB and a DL communication direction as a direction of current use is particularly effective to reduce interference that affects communication between a UE and an adjacent eNB that sets relatively low power and use the corresponding resource as legacy use (e.g., UL communication) in order to change and use a legacy UL resource as use of DL communication. Accordingly, when use of a legacy radio resource is dynamically changed according to a load state of a system, if channel state information (CSI) estimation (or interference estimation) and report are performed without consideration of different interference characteristics for respective DL subframes (or subframe sets), overall communication performance of a network may be degraded due to inaccurate channel state information.

Accordingly, the present invention proposes a method for effectively performing channel state estimation (or interference estimation) and report in consideration of different interference characteristics for respective radio resource sets when use of a radio resource is dynamically changed according to a system load state. Here, radio resource sets having different interference characteristics may be classified according to a predefined rule. For example, the radio resource sets may be classified into a resource set in which the same direction of communication is performed between cells and a resource set in which different directions of communication is performed.

Hereinafter, for convenience of description of the present invention, channel state estimation process (CSI Process) related information refers to information that is indicated to a UE by an eNB for channel state estimation between a specific cell and the UE. The channel state estimation process (CSI Process) related information may include, for example, a type of a reference signal used for channel state estimation, configuration, periodicity, subframe offset, a virtual cell ID (or a physical cell ID) for generation of a sequence of a reference signal, and so on.

In addition, interference measurement resource (IMR) related information refers to resource indicated to a UE by an eNB in order to effectively measure external interference received on communication between a specific cell and the UE. IMR may be defined based on, for example, a predefined resource unit (or configuration/periodicity/subframe offset).

Resource-specific CSI measurement or restricted CSI measurement related information refers to information indicated to a UE by an eNB in order to independently perform channel state estimation (or interference estimation) operations and report operations on respective radio resource sets with different interference characteristics. Resource-specific CSI measurement or restricted CSI measurement related information may include information about radio resource sets with different interference characteristics and configuration information (e.g., channel state report periodicity/subframe offset/UL resource index) for independent channel state reports on respective radio resource sets with different interference characteristics.

Hereinafter, for convenience of description of the present invention, the case in which cells dynamically change use of a legacy radio resource according to a system load state of the corresponding cell under a TDD system environment is assumed. The method proposed according to the present invention can also be extended to a situation in which two or more radio resource sets with different interference characteristics are defined as well as a situation in which use of a legacy radio resource is dynamically changed according to a system load state in a FDD system.

According to an embodiment of the present invention, an eNB may notify a UE of "one channel state estimation process information item and one interference measurement resource information item associated with the corresponding channel state estimation process" and "one resource-specific CSI measurement (or restricted CSI measurement) related information" through a predefined signal such that the UE may perform independent channel state estimation (or interference estimation) on radio resource sets with different interference characteristics.

Here, the interference measurement resource is defined as one common interference measurement resource (between radio resource sets with different interference characteristics) rather than being independently set for the respective radio resource sets with different interference characteristics. In addition, in order to express all interference measurement resources on radio resource sets with different interference characteristics, interference measurement resource information may include parameters of a (legacy) specific interference measurement resource and an additional offset parameter. For example, assuming that a time point indicated by a specific interference measurement resource based on periodicity T is SF #(n+i*T) (here, i is an integer greater than or equal to 0), the additional offset parameter (i.e., $K_{OFFSET}$) may indicate that the corresponding interference measurement resource is also expressed at a time point of SF #(n+i*T+$K_{OFFSET}$).

Temporal positions of valid interference measurement resources for respective radio sets with different interference characteristics may be configured to be deduced from temporal position information of each radio set, which is indicated to a UE by an eNB. Alternatively, temporal positions of valid interference measurement resources for respective radio sets with different interference characteristics may be configured to be deduced from temporal position information items of respective restricted CSI measurement subframe sets, which are indicated to a UE by an eNB. Here, the restricted CSI measurement subframe sets may determine i) a type of restricted CSI measurement subframe set associated with aperiodic channel state report triggered in subframes in which the an interference measurement resource is not configured, ii) a type of channel state information, or iii) a type of an interference measurement value.

For example, when radio resource sets with different interference characteristics are defined as two subframe sets, temporal positions of valid interference measurement resources of a specific subframe set may be limited to interference measurement resources present in a corresponding specific subframe set. That is, temporal position information of radio resource sets with different interference characteristics may be interpreted as an indicator for implicitly a temporal position of valid interference measurement resources for respective radio resource sets. Accordingly, the UE may independently perform an interference estimation operation on separate sets using only an interference measurement resource present in each subframe set. In addition, the UE may independently calculate channel state information (e.g., CQI, PMI, and RI) about sets based on interference estimation values for the separate sets and may transmit the channel state information to an eNB based on channel state report related parameters (e.g., periodicity/subframe offset/UL resource index) for each predefined set.

Figure 11:
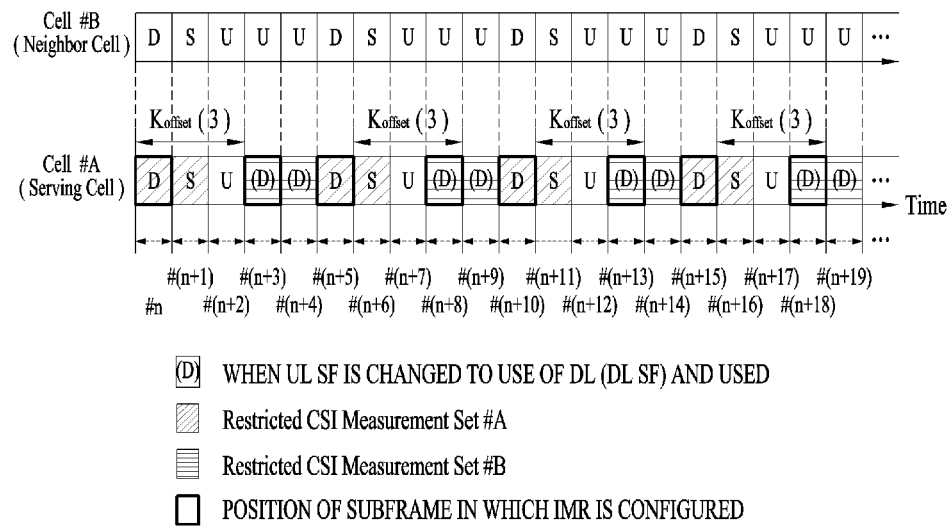
FIGS. 11 to 14 are diagrams illustrating an embodiment in which independent channel state estimation (or interference estimation) and report are performed on radio resource sets with different interference characteristics according to the present invention.

FIG. 11 is a diagram illustrating an embodiment in which a UE performs independent channel state estimation (or interference estimation) and report on respective radio resource sets with different interference characteristics based on "one channel state estimation process information item and one interference measurement resource information item associated with the corresponding channel state estimation process" and "one resource-specific CSI measurement related information" received from an eNB according to the present invention.

In FIG. 11, a TDD system is assumed and UL-DL configuration set via an SIB of separate sets is assumed to be UL-DL #0 (i.e., DSUUUDSUUU). In addition, in FIG. 11, it is assumed that cell #A changes and uses legacy UL SF #(n+3), UL SF #(n+4), UL SF #(n+8), UL SF #(n+9), UL SF #(n+13), UL SF #(n+14), UL SF #(n+18), and UL SF #(n+19) for DL communication along with increase in DL loading amount of a system. In addition, it is assumed that interference measurement resource information includes additional offset value 3 together with specific 4 Port CSI-RS configuration (e.g., Zero-Power CSI-RS configuration) based on periodicity 5 ms and subframe offset 0. In addition, it is assumed that different characteristics of radio resource sets in which restricted CSI measurement is performed are defined as two subframe sets (i.e., Set #A and Set #B) and are classified into a resource set in which the same direction of communication is performed between cells and a resource set in which different direction of communication is performed.

Referring to FIG. 11, a UE may use only an interference measurement resource present on Set #A (i.e., interference measurement resource on SF #n, SF #(n+5), SF #(n+10), and SF #(n+15)) for interference estimation for Set #A and may independently report Set #A related channel state estimation information (e.g., CQI, PMI, and RI) calculated based on an interference estimation value on the corresponding Set #A to an eNB according to predefined Set #A related channel state report parameters (e.g., periodicity/subframe offset/UL resource index). Similarly, the UE may perform interference estimation/channel state estimation/channel report operation on Set #B in the same way as in the aforementioned Set #A.

According to another embodiment of the present invention, an eNB may be configured to notify a UE of "one channel state estimation process information item and a plurality of interference measurement resource information items associated with the corresponding channel state estimation process" and "one resource-specific CSI measurement (or restricted CSI measurement) related information" through a predefined signal.

Here, a total number of interference measurement resources may be configured to be equal to the number of radio resource sets with different interference characteristics, and accordingly, independent interference measurement resources may be defined for the respective radio resource sets with different interference characteristics.

Accordingly, a UE may independently perform an interference estimation operation on separate radio resource sets using interference measurement resources associated with respective radio resource sets. In addition, the UE may independently calculate channel state information (e.g., CQI, PMI, and RI) of respective radio resource sets based on interference estimation values for separate radio resource sets and may transmit the channel state information to an eNB based on predefined channel state report related parameters (e.g., periodicity/subframe offset/UL resource index) for respective sets.

In addition, a total number of interference measurement resources may be configured as a predefined specific number. For example, the total number of the interference measurement resources may be configured as a smaller value than the number of radio resource sets with different interference characteristics, but on the other hand, the total number of the interference measurement resources may be configured as a greater value than the number of radio resource sets with different interference characteristics.

In addition, temporal positions of valid interference measurement resources for respective radio resource sets with different interference characteristics may be configured to be deduced from temporal position information of respective radio resource sets, which is indicated to a UE by an eNB. Alternatively, temporal positions of valid interference measurement resources for respective radio resource sets with different interference characteristics may be configured to be deduced from temporal position information of respective restricted CSI measurement subframe sets, which is indicated to a UE by an eNB. Here, the restricted CSI measurement subframe sets may determine i) a type of restricted CSI measurement subframe set associated with aperiodic channel state report triggered in subframes in which the an interference measurement resource is not configured, ii) a type of channel state information, or iii) a type of an interference measurement value. This method is particularly effective to the case in which temporal positions of specific radio resource sets with different interference characteristics do not (partially) correspond to temporal positions of interference measurement resources configured for the corresponding specific radio sets.

For example, when radio resource sets with different interference characteristics are defined as two subframe sets, a temporal position of a valid interference measurement resource of a specific subframe set may be restricted to interference measurement resources present on a corresponding specific subframe set among interference measurement resources configured for the corresponding specific radio resource set.

As another example, interference measurement resources that are independently defined for respective radio resource sets with different interference characteristics or interference measurement resources defined as the number of predetermined specific values may be defined to be independently (e.g., differently) defined on i) a time resource region or/and ii) a frequency resource region or/and iii) a sequence resource region or may be defined to overlap with each other on some resource regions. For example, when a plurality of interference measurement resources are differently defined on a frequency resource region (or/and a sequence resource region), temporal positions of valid interference measurement resources for respective radio resource sets with different interference characteristics may be configured to partially or entirely overlap with each other via a predefined signal.

Figure 12:
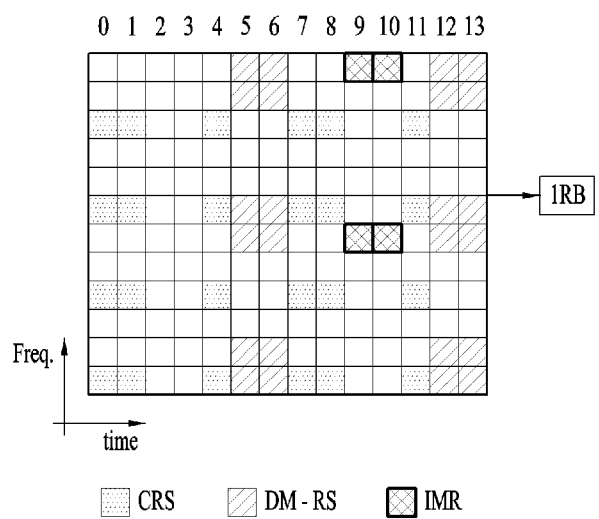

FIG. 12 is a diagram illustrating an embodiment in which an interference measurement resource (IMR) is mapped on one resource block RB in the case of a normal CP according to the above description.

Figure 13:
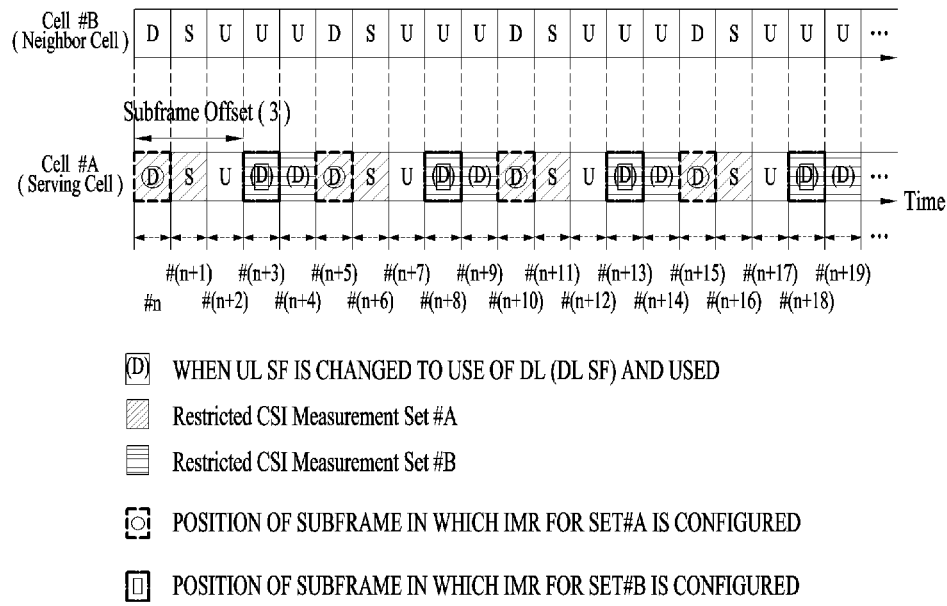

FIG. 13 is a diagram illustrating an embodiment in which a UE performs independent channel state estimation (or interference estimation) and report on respective radio resource sets with different interference characteristics based on "one channel state estimation process information item and two interference measurement resource information items associated with the corresponding channel state estimation process" and "one resource-specific CSI measurement related information" received from an eNB according to the present invention. Here, it is assumed that a system environment and positions of radio resources, uses of which are changed, are the same as in FIG. 11.

In FIG. 13, it is assumed that different characteristics of radio resource sets in which restricted CSI measurement is performed are defined as two subframe sets (i.e., Set #A and Set #B) and independent interference measurement resources are configured for respective radio resource sets with different interference characteristics. In detail, interference measurement resource information items of Set #A are assumed to be defined as specific 4 Port CSI-RS configuration (e.g., Zero-Power CSI-RS configuration) based on periodicity 5 ms and subframe offset 0 and interference measurement resource information items of Set #B are assumed to be defined as specific 4 Port CSI-RS configuration (e.g., Zero-Power CSI-RS configuration) based on periodicity 5 ms and subframe offset 3.

In FIG. 13, a UE may perform an interference estimation operation on Set #A using only a Set #A related interference measurement resource (i.e., interference measurement resource on SF #n, SF #(n+5), SF #(n+10), and SF #(n+15)) present on Set #A and may independently report Set #A related channel state estimation information (e.g., CQI, PMI, and RI) calculated based on the corresponding interference estimation value to an eNB according to predefined Set #A related channel state report parameters (e.g., periodicity/ subframe offset/UL resource index). Similarly, the UE may perform interference estimation/channel state estimation/ channel report operation on Set #B in the same way as in the aforementioned Set #A.

According to another embodiment of the present invention, an eNB may be configured to notify a UE of "one channel state estimation process information item and a plurality of interference measurement resource information items associated with the corresponding channel state estimation process" through a predefined signal.

Here, a total number of interference measurement resources may be configured to be equal to the number of radio resource sets with different interference characteristics (or the number of subframe sets for restricted CSI measurement) or may be configured to be a predefined specific value (e.g., a smaller or greater value than the number of radio resource sets with different interference characteristics). In addition, the UE may independently perform an interference estimation (or channel estimation) operation on separate sets using interference measurement resources associated with respective sets.

Hereinafter, for convenience of description of the present embodiment, a situation in which two interference measurement resource information items are configured with respect to one channel state estimation process. Here, it is assumed that subframe sets with different interference characteristics for respective interference measurement resources (e.g., a fixed use of DL subframe set and a DL subframe set generated via a use changing operation) are associated with each other.

In addition, resource-specific CSI measurement (or restricted CSI measurement) subframe sets defined for one channel state estimation process may determine valid time points may function such that respective interference measurement resources determine valid time points (or subframe positions) for interference measurement and may simultaneously function so as to determine i) a type of a resource-specific CSI measurement subframe set, ii) a type of channel state information, or iii) a type of an interference measurement value, which is associated with aperiodic CSI report triggered in time points (or subframes) in which an interference measurement resource is not set.

According to another embodiment of the present invention, an eNB may be configured to notify a UE of "a plurality of channel state estimation process information items and interference measurement resource information items associated with respective channel state estimation processes" via a predefined signal.

Here, the total number of channel state estimation processes may be configured to be the same as the number of radio resource sets with different interference characteristics, and independent interference measurement resources may be defined for respective channel state estimation processes. Accordingly, independent channel state estimation processes may be defined for respective radio resource sets with different interference characteristics. Accordingly, the UE may independently perform an interference estimation operation on separate radio resource sets with different interference characteristics using interference measurement resources associated with respective channel state estimation processes. In addition, the UE may independently calculate channel state information items (e.g., CQI, PMI, and RI) for respective sets based on interference estimation values for separate sets and may transmit the channel state information items to the eNB based on channel state report related parameters (e.g., periodicity/subframe offset/UL resource index) for respective predefined channel estimation processes (or sets).

As another example, the total number of channel state estimation processes and/or interference measurement resources may be set as a predefined specific value. For example, the total number of channel state estimation processes may be set as a smaller value than the number of radio resource sets with different interference characteristics or a greater value than the number of radio resource sets and may be configured such that a plurality of (e.g., M>0, M is an integer) channel state estimation processes shares a relatively small (e.g., M>N>0, N is an integer) number of interference measurement resources. In this case, the eNB may further notify the UE of information about radio resource sets with different interference characteristics and configuration information (e.g., channel state report periodicity/subframe offset/UL resource index) for independent channel state reports for respective radio resource sets with different interference characteristics via a predefined signal. In addition, temporal positions of valid interference measurement resources for respective channel state estimation processes may be configured to be deduced from temporal position information of radio resource sets (with different interference characteristics) associated with respective channel state estimation processes, which is indicated to the UE by the eNB. This method is particularly effective to the case in which temporal positions of specific radio resource sets (with different interference characteristics) associated with a specific channel state estimation process do not (partially) correspond to temporal positions of interference measurement resources configured for the corresponding processes.

For example, it is assumed that radio resource sets with different interference characteristics are defined as two subframes and independent channel state processes and interference measurement resources are configured for respective subframe sets. In this case, a temporal position of a valid interference measurement resource of a subframe set associated with a specific channel state estimation process may be restricted to interference measurement resources present on a corresponding subframe set among interference measurement resources configured for a corresponding process.

As another example, interference measurement resources that are independently defined for channel state estimation processes (i.e., separate radio resource sets with different interference characteristics) or interference measurement resources defined as the number of predetermined specific values may be independently (e.g., differently) defined on i) a time resource region, ii) a frequency resource region, and/or iii) a sequence resource region or may be defined to overlap with each other a partial resource region. Here, when a plurality of interference measurement resources are differently defined on a frequency resource region (and/or a sequence resource region), temporal positions of valid interference measurement resources for respective channel state estimation processes (i.e., separate radio resource sets with different interference characteristics) may be configured to partially or entirely overlap with each other through a predefined signal.

Figure 14:
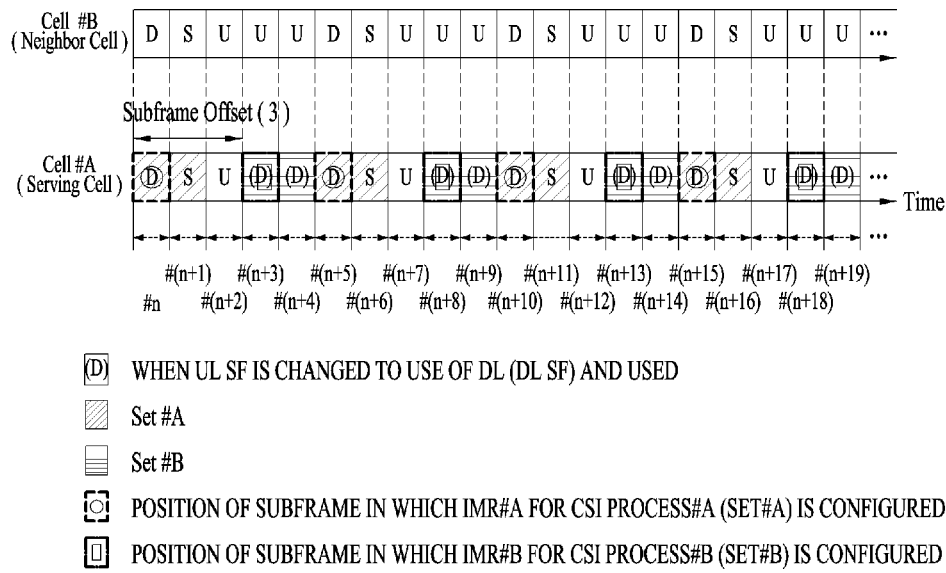

FIG. 14 is a diagram illustrating an embodiment in which a UE performs independent channel state estimation (or interference estimation) and report on respective radio resource sets with different interference characteristics based on "two channel state estimation process information items and interference measurement resource information items associated with the respective channel state estimation processes" received from an eNB according to the present invention.

In FIG. 14, it is assumed that a system environment and positions of radio resources with changed use are the same as in FIG. 11. In FIG. 14, it is assumed that radio resource sets with different interference characteristics are defined as two subframe sets (i.e., Set #A and Set #B) and independent channel state processes (i.e., CSI Process #A and CSI Process #B) are configured for respective subframe sets. In detail, interference measurement resource information items of CSI process #A (i.e., Set #A) are assumed to be defined as specific 4 Port CSI-RS configuration (e.g., Zero-Power CSI-RS configuration) based on periodicity 5 ms and subframe offset 0 and interference measurement resource information items of CSI Process #B (i.e., Set #B) are assumed to be defined as specific 4 Port CSI-RS configuration (e.g., Zero-Power CSI-RS configuration) based on periodicity 5 ms and subframe offset 3.

In FIG. 14, a UE may perform an interference estimation operation on Set #A using only a CSI Process #A (i.e., Set #A) related interference measurement resource (i.e., interference measurement resource on SF #n, SF #(n+5), SF #(n+10), and SF #(n+15)) present on Set #A. The UE may independently report Set #A related channel state estimation information (e.g., CQI, PMI, and RI) calculated based on an interference estimation value according to Set #A to the eNB according to predefined CSI Process #A (i.e., Set #A) related channel state report parameters (e.g., periodicity/subframe offset/UL resource index). In addition, the UE may perform interference estimation/channel state estimation/channel report operation on Set #B in the same way as in the aforementioned Set #A.

According to another embodiment of the present invention, when an eNB is configured to notify a UE of "a plurality of channel state estimation (CSI) processes information items and interference measurement resource (IMR) information items associated with respective channel state estimation processes" through a predefined signal, the UE may be configured to operate to emulate a situation in which a predefined smaller number (e.g., N, M>N>0) (or a smaller or equal number (e.g., N, M≥N>0)) than the number of actual channel state estimation processes (e.g., M, M>0) for the reason of the complexity (or processing time or complexity of an operation for simultaneously driving a plurality of channel state estimation processes) of a channel state estimation operation of the UE. As another example, the UE may be configured to operate to emulate the number of actual channel state estimation processes (e.g., M, M>0) as one channel state estimation process for the reason of the complexity (or processing time or complexity of an operation for simultaneously driving a plurality of channel state estimation processes) of a channel state estimation operation of the UE.

As another example, the present invention can also be extended to the case in which the UE operates to emulate a situation in which M channel state estimation processes are configured as a smaller integer (or a smaller or equal integer than predefined M (e.g., N, M≥N>0)) channel state estimation processes. This embodiment of the present invention is particularly effective to a channel estimation operation of UEs that have no capability of simultaneously managing a relatively high number of channel state estimation processes (or two or more channel state estimation processes).

Hereinafter, for convenience of description of an embodiment of the present invention, it is assumed that a UE operates to emulate two channel state estimation processes as a situation in which one channel state estimation process is configured. Here, it is assumed that two channel state estimation processes are defined for independent interference estimation/channel state estimation/channel report operation on respective radio resource sets with different interference characteristics.

According to an embodiment of the present invention, for example, conditions in which i) valid measurement time points of interference measurement resources of two respective channel state estimation processes are configured not to correspond to each other, ii) additional CSI measurement subframe sets (or restricted CSI measurement subframe sets) are not configured for two channel state estimation processes, and/or iii) channel state information items of two channel state estimation processes are not configured to be simultaneously reported during an aperiodic CSI report related operation may be applied such that two channel state estimation processes may be emulate as TDM restricted CSI measurement of one channel state estimation process. Accordingly, when two channel state estimation processes are performed to be emulated as TDM restricted CSI measurement of one channel state estimation process, a TDM restricted CSI measurement operation for specific radio resource sets with different interference characteristics may be emulated to be performed based on i) interference measurement resource or ii) reference signal configuration for channel state estimation of one of two channel state estimation processes associated with a legacy corresponding radio resource set.

In addition, a time point of a channel state information (CSI) reference resource is affected by conditions such as i) a total number of configuration channel state estimation processes, ii) a transmission mode type (e.g., TM 1 to 9 type and TM 10 type), and/or iii) a system type (e.g., an FDD system type and a TDD system type).

Accordingly, when an embodiment of the present invention is applied, a time point of a channel state information reference resource may be configured to be determined (i.e., the number of valid channel state estimation processes are emulated as one) to be the same as in the case in which a smaller number of channel state estimation processes (e.g., one channel state estimation process) are configured than the number of actual channel state estimation processes instead of determining a time point of a channel state information reference resource by emulating that a plurality of (e.g., two) channel state estimation processes are configured.

That is, when M channel state estimation processes are emulated to be performed like a situation in which a smaller integer (e.g., N, M>N) (or a smaller or equal integer than predefined M (e.g., N, M≥N>0) of channel state estimation processes are configured than predefined M, this example can also be extended to the case in which a time point of a channel state information reference resource of the corresponding example is defined to be the same as in the case in which a smaller integer than M (or a smaller or equal integer than M) (i.e., N) of channel state estimation processes are configured (i.e., the number of valid channel state estimation processes is emulated as a smaller integer than predefined M (or a smaller or equal integer than M).

Here, the number of last channel state estimation processes for lastly determining a time point of a channel state information reference resource may be defined as a concept of "the number of valid channel state estimation processes".

For example, it is assumed that two channel state estimation processes are used for independent i) interference estimation, ii) channel state estimation, and/or iii) channel report operation on legacy DL subframe sets with different interference characteristics (of a serving eNB) and a UL subframe set with a changed use. In addition, it is assumed that two other channel state processes are further used for another purpose (e.g., for channel state measurement between a corresponding UE and eNBs that participate in a cooperation communication (CoMP) operation). In this case, according to an embodiment of the present invention, the former two channel state estimation processes may be emulated as one channel state estimation process. Accordingly, according to the present embodiment, the total number of valid channel state estimation processes may be emulated as three instead of four and a time point of a channel state information reference resource may be determined as a previous valid DL subframe including 4 ms from a UL subframe in which (periodic or aperiodic) channel state report is performed, based on three corresponding channel state estimation processes.

For reference, when the total number of channel state estimation processes are configured as four in a TDD system, a time point of a channel state information reference resource is determined as a previous valid DL subframe including 5 ms from a UL subframe in which (periodic or aperiodic) channel state report is performed. Here, the valid DL subframe may be i) a fixed (or static) use of DL subframe (e.g., subframes #0, #1, #5, and #6 in which a system information/synchronization information channel (e.g., PBCH (MIB), SIB, PAGING, and PSS/SSS) is transmitted in the case of a TDD system, ii) a DL subframe on a SIB, iii) a UL subframe with a changed use, and/or iv) a UL subframe on a SIB but may be defined as a subframe configured for DL via use change according to a predefined rule.

As another example, when a specific UE receives data/control information based on a cooperative multipoint transmission/reception (CoMP) operation between two eNBs and respective corresponding eNBs dynamically change uses of radio resources according to their load states, four of total channel state estimation processes may be defined for the corresponding UE in consideration of two resource sets with different interference characteristics, generated via a use changing operation of a radio resource of a serving eNB and channel state measurement for each eNB that participates in CoMP. In this case, 'two channel state estimation processes for two resource sets with different interference characteristics, generated via a use changing operation of a radio resource of a serving eNB' and 'two channel state estimation processes for channel state measurement for each eNB that participates in CoMP' may each be emulated like a case in which one channel state estimation process or one channel state estimation process is configured. Accordingly, the total number (i.e., the number of valid channel state estimation processes) of last channel state estimation processes for lastly determining a time point of a channel state information reference resource may be deduced as two.

According to the present embodiment, two (or a plurality of) channel state estimation processes emulated as one valid channel estimation processes may be configured to be associated with the same Non-Zero Power CSI-RS configuration or configured to be associated with specific Non-Zero Power reference signal configuration with channel estimation use.

Furthermore, an eNB may notify a UE of information about whether the aforementioned configuration is applied and/or information about the proposed rule through a predefined signal (e.g., a physical layer or high layer signal) or the UE may be configured to implicitly recognize the aforementioned configuration information items based on a predefined rule.

In addition, according to the present invention, when use of a radio resource is dynamically changed, a valid CSI reference resource may be configured to be limited to positions (or time points) of DL subframes on UL-DL configuration associated with a predefined representative DL HARQ timeline. Similarly, when use of a radio resource is dynamically changed, a valid CSI reference resource may be configured to be limited to positions (or time points) of DL subframes on UL-DL configuration associated with a predefined representative UL HARQ timeline.

Hereinafter, a UL-DL configuration associated with a representative DL HARQ timeline and/or a UL-DL configuration associated with a representative UL HARQ timeline may each also be referred to as a UL-DL configuration configured to continuously ensure a DL HARQ timeline and/or a UL HARQ timeline when use of a radio resource is dynamically changed. Hereinafter, according to the present invention, a UL-DL configuration associated with a representative DL HARQ timeline and a UL-DL configuration associated with a representative UL HARQ timeline may be defined or referred to as a DL-reference UL-DL configuration and a UL-reference UL-DL configuration, respectively.

For example, the UL-DL configuration associated with the representative DL HARQ timeline (or the representative UL HARQ timeline) may be defined as a specific UL-DL configuration (i.e., a kind of operation based on union of a) and b)) including a maximum number of DL subframes and positions of a) legacy DL subframes (on a SIB) and b) DL subframes that are further generated via a dynamic changing operation. Alternatively, a UL-DL configuration associated with a representative DL HARQ timeline (or a representative UL HARQ timeline) may be defined as a specific UL-DL configuration (i.e., a kind of operation based on union of a) and c)) including a maximum number of DL subframes and positions of a) legacy DL subframes (on a SIB) and c) DL subframes to be generated in a predefined specific time period (e.g., 10 ms or a dynamic changing period). That is, when dynamic change in use in a radio resource is performed according to one selected from UL-DL configurations #0, #1, and #2, a representative UL-DL configuration may be defined as UL-DL configuration #2.

As another example, a UL-DL configuration associated with a representative DL HARQ timeline (or a representative UL HARQ timeline) may be defined as a specific UL-DL configuration (i.e., a kind of operation based on union of a) and b)) including a minimum number of DL subframes and positions of a) legacy DL subframes (on a SIB) and b) DL subframes that are further generated via a dynamic changing operation. Alternatively, a UL-DL configuration associated with a representative DL HARQ timeline (or a representative UL HARQ timeline) may be defined as a specific UL-DL configuration (i.e., a kind of operation based on union of a) and c)) including a minimum number of DL subframes and positions of a) legacy DL subframes (on a SIB) and c) DL subframes to be generated in a predefined specific time period (e.g., 10 ms or a dynamic changing period).

As another example, a UL-DL configuration associated with a representative UL HARQ timeline (or a representative DL HARQ timeline) may be defined as a specific UL-DL configuration (i.e., a kind of operation based on union of a) and b)) including a maximum number of UL subframes and positions of a) legacy UL subframes (on a SIB) and b) UL subframes to be further generated via a dynamic changing operation. Alternatively, a UL-DL configuration associated with a representative UL HARQ timeline (or a representative DL HARQ timeline) may be defined as a specific UL-DL configuration (i.e., a kind of operation based on union of a) and c)) including a maximum number of UL subframes and positions of a) legacy UL subframes (on a SIB) and c) UL subframes to be generated in a predefined specific time period (e.g., 10 ms or a dynamic changing period).

As another example, a UL-DL configuration associated with a representative UL HARQ timeline (or a representative DL HARQ timeline) may be defined as a specific UL-DL configuration (i.e., a kind of operation based on union of a) and b)) including a minimum number of UL subframes and positions of a) legacy UL subframes (on a SIB) and b) UL subframes to be further generated via a dynamic changing operation. Alternatively, a UL-DL configuration associated with a representative UL HARQ timeline (or a representative DL HARQ timeline) may be defined as a specific UL-DL configuration (i.e., a kind of operation based on union of a) and c)) including a minimum number of UL subframes and positions of UL subframes to be generated in a predefined specific time period (e.g., 10 ms or a dynamic changing period).

In addition, according to the present invention, the representative DL HARQ timeline and the representative UL HARQ timeline may be configured to be defined based on the same (representative) UL-DL configuration.

For example, the representative DL HARQ timeline and the representative UL HARQ timeline may be configured to be defined based on the same (representative) UL-DL configuration deduced based on a method for determining a common (representative) UL-DL configuration. Alternatively, the representative DL HARQ timeline and the representative UL HARQ timeline may be configured to be defined based on respective independent (e.g., different) (representative) UL-DL configurations.

Furthermore, an eNB may notify a UE of information about whether the proposed rules are applied and/or information about the proposed rule through a predefined signal (e.g., a physical layer or high layer signal) or the UE may be configured to implicitly recognize the aforementioned information items based on a predefined rule.

Figure 15:
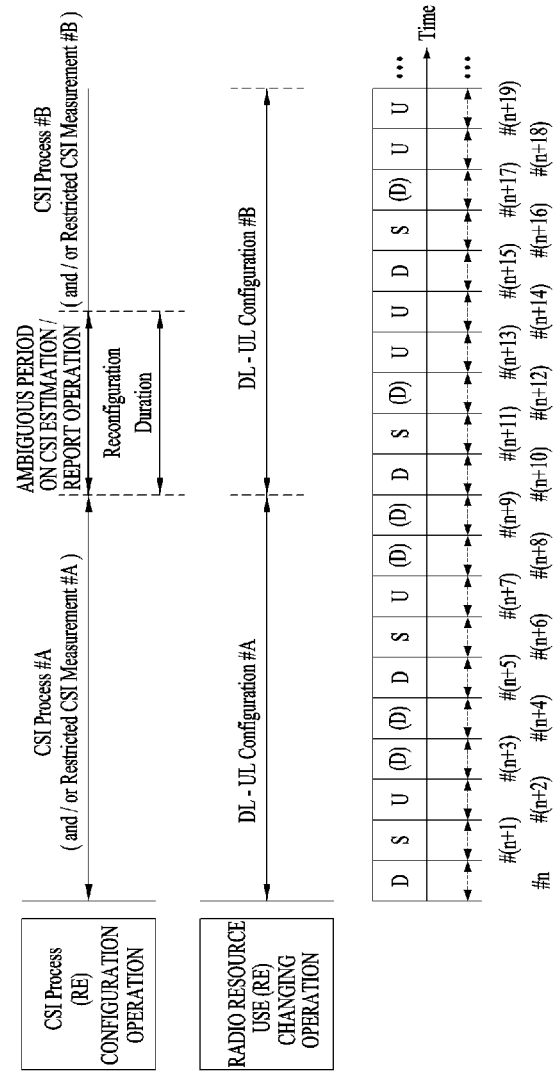
FIG. 15 is a diagram illustrating the case in which a signal type used for (re)configuration of a channel state estimation process (and/or restricted CSI measurement) and a signal type used for dynamic (re)change of use of a radio resource are different.

With reference to FIG. 15, the case in which a signal type used to (re)configuration of a channel state estimation process (and/or restricted CSI measurement) is not the same as a signal type used to dynamically (re)change used of a radio resource will be described below.

It is assumed that a signal type used to (re)configuration of a channel state estimation process (and/or restricted CSI measurement) is not the same as a signal type used to dynamically (re)change used of a radio resource. In this case, a problem may occur in that channel state information and/or interference estimation information, based on a specific channel state estimation process (and/or restricted CSI measurement) cannot appropriately reflect influence of a radio resource with recently changed use or cannot appropriately reflect recent external interference influence.

In FIG. 15, it is assumed that an RRC signal is used to (re)configure a specific channel state process (and/or restricted CSI measurement) and an MAC signal (or a physical channel (PHY) signal) is used to dynamically (re)change use of a radio resource. In addition, it is assumed that a UL-DL configuration configured through a SIB under a TDD system is UL-DL #0 (i.e., DSUUUDSUUU) and (re)change of use of a radio resource is performed with a predefined period of 10 ms.

Accordingly, when use of a radio resource is changed to UL-DL configuration #B from UL-DL configuration #A using a MAC signal (or a physical channel signal), i) legacy channel state estimation process #A for UL-DL configuration #A needs to be changed to channel state estimation process #B for updated UL-DL configuration #B, ii) restricted CSI measurement #A for UL-DL configuration #A needs to be changed to restricted CSI measurement #B for updated UL-DL configuration #B, and/or iii) interference measurement resource #A for UL-DL configuration #A needs to be changed to interference measurement resource #B for updated UL-DL configuration #B.

However, a time quantity required for i) (re)configuration completion of channel state estimation process, ii) (re)configuration completion of restricted CSI measurement, and/or iii) (re)configuration completion of an interference measurement resource, based on a RRC signal based may be longer than in the case of a MAC signal (or a physical channel signal). Accordingly, even if use of a radio resource is updated to UL-DL configuration #B, i) a (re)configuration operation of a channel state estimation process, ii) a (re)configuration operation of a restricted CSI measurement, and/or iii) a (re)configuration operation of an interference measurement resource, which reflect the changed interference/channel environment/DL-UL configuration may not be completed. Accordingly, in this case, an ambiguous period may be generated in a channel state estimation (or interference estimation) and report operations.

Accordingly, the present invention proposes a method for effectively overcoming an ambiguity issue of channel state estimation (or interference estimation) and report operations, which may occur when a signal type used to (re)configure i) a channel state estimation process, ii) restricted CSI measurement, and/or iii) an interference measurement resource is different from a signal type used to (re)change use of a radio resource.

For example, for further description of the case in which i) a time point for dynamic (re)change completion of use of a radio resource and a time point for (re)configuration completion of a channel state estimation process do not correspond to each other, ii) a time point for dynamic (re)change completion of use of a radio resource and a time point for (re)configuration completion of restricted CSI measurement do not correspond to each other, and/or iii) a time point for dynamic (re)change completion of use of a radio resource and a time point for (re)configuration completion of an interference measurement resource do not correspond to each other, it is assumed that subframe types such as a fixed use of DL subframe (hereinafter, F_DL SF), a fixed use of UL subframe (hereinafter, F_UL SF), and a subframe (hereinafter, C_SF) with changed use are present.

Accordingly, when the C_SF is configured for DL and accordingly i) a channel state estimation process, ii) an interference measurement resource, and/or iii) restricted CSI measurement are defined for a channel/interference estimation operation on the C_SF for DL, a periodic CSI report operation may be performed on the corresponding C_SF for DL based on the definition (i.e., the periodic CSI report operation is configured to be performed through the F_UL SF). Here, during the periodic CSI report based on i) the channel state estimation process, ii) the interference measurement resource, and/or iii) the restricted CSI measurement, which are configured for the C_SF for DL, when the corresponding C_SF is (re)changed for UL through a MAC signal (or a physical channel signal), the interference measurement resource configured on the corresponding C_SF is not valid any longer. Accordingly, in this situation, since the (re)configuration operation of i) the channel state estimation process, ii) the interference measurement resource, and/or iii) the restricted CSI measurement, based on an RRC signal are not completed, an ambiguity issue may occur in terms of a measure to be applied to a UL control channel (PUCCH)-based channel state information transmission operation.

Accordingly, according to the pre sent invention, when a) a time point for dynamic (re)change completion of use of a radio resource and b) a time point for (re)configuration completion of a channel state estimation process, restricted CSI measurement, and/or an interference measurement resource do not correspond to each other due to different signal types, a UE may be configured to transmit a predefined specific value of channel state information (e.g., CQI, PMI, and RI) to an eNB.

The specific value of channel state information transmitted by the UE may be predefined by the eNB for the UE through a predefined signal. For example, a specific value of CQI transmitted by the UE may be defined as CQI Index #0 (i.e., out of range), a specific value of RI may be defined as 1, and/or a specific value of PMI may be defined as an RI 1 based specific codebook index (e.g., a codebook index corresponding to an identity matrix). That is, the eNB may allow the UE to transmit predefined specific values of CSI information items so as to implicitly recognize i) a time point of (re)configuration completion of a channel state estimation process, ii) a time point of (re)configuration completion of restricted CSI measurement, and/or iii) a time point of (re)configuration completion of an interference measurement resource of the UE.

As another example, a specific value of CQI, a specific value of RI information, and/or a specific value of PMI, transmitted by the UE may be defined as i) last values (or latest values) prior to a (re)configuration operation of a channel state estimation process, ii) last values (or latest values) prior to a (re)configuration operation of restricted CSI measurement, and/or iii) last values (or latest values) prior to a (re)configuration operation of an interference measurement resource. In addition, a specific value of channel state information transmitted by the UE may be configure to be transmitted through a predefined specific UL resource (e.g., PUCCH/PUSCH) and the eNB may notify the UE of information about the channel state information (e.g., a UL resource) through a predefined signal.

In detail, an environment in which an RRC signal is used for (re)configuration of a specific channel state estimation process, specific restricted CSI measurement, and/or a specific interference measurement resource and a MAC signal (or a physical channel signal) is used for dynamic (re)change of use of a radio resource is assumed. Under this assumption, even if use of the radio resource is updated, when a reconfiguration operation of i) the channel state estimation process, ii) the restricted CSI measurement, and/or iii) the interference measurement resource, which reflect the change interference/channel environment/DL-UL configuration is not completed, the UE may transmit a predefined specific value of channel state information (e.g., CQI, PMI, and RI) to the eNB through a predefined specific UL resource, according to the present invention.

According to the present invention, when a) a time point for dynamic (re)change completion of use of a radio resource and b) a time point for (re)configuration completion of a channel state estimation process (and/or restricted CSI measurement or an interference measurement resource) do not correspond to each other due to different signal types, the UE may be configured to omit a channel state information report operation. Likewise, the method for omitting the channel state information report operation may be particularly effective to a periodic CSI report operation of the UE.

For example, an environment in which in which an RRC signal is used for (re)configuration of a specific channel state estimation process, restricted CSI measurement, and/or a interference measurement resource and a MAC signal or a physical channel signal is used for dynamic (re)change of use of a radio resource is assumed. Under this assumption, even if use of the radio resource is updated, when a reconfiguration operation of i) the channel state estimation process, ii) the restricted CSI measurement, and/or iii) the interference measurement resource, which reflect the change interference/channel environment/DL-UL configuration is not completed, the UE may omit the channel state information report operation according to the present invention.

According to another embodiment of the present invention, the case in which use of a radio resource on a specific cell (or a component carrier) is configured to be dynamically changed and a UL control channel (PUCCH) and a UL data channel (PUSCH) are configured to be simultaneously transmitted under an environment in which a carrier aggregation (CA) scheme is applied will be described below. In this case, when i) a time point for dynamic (re)change completion of use of a radio resource and a time point for (re)configuration completion of a channel state estimation process do not correspond to each other, ii) a time point for dynamic (re)change completion of use of a radio resource and a time point for (re)configuration completion of restricted CSI measurement do not correspond to each other, and/or iii) a time point for dynamic (re)change completion of use of a radio resource and a time point for (re)configuration completion of an interference measurement resource do not correspond to each other, and accordingly, a UL control channel (PUCCH) based (periodic) channel state report operation is omitted, corresponding extra power (i.e., power required for a (periodic) channel state report based on a UL control channel (PUCCH)) may be configured to be used for UL data channel (PUSCH) based data transmission and/or UL control information (UCI) transmission of a corresponding time point according to a predefined configuration.

For example, the present invention may be particularly effective to transmission of UL control information (UCI) and/or data with high reliability based on a UL data channel (PUSCH) when the sum (i.e., a+b) of a) power required for a UL control channel (PUCCH) based (periodic) change state report and b) power required for transmission of UL control information (UCI) and/or data based on a UL data channel (PUSCH) reaches maximum transmission power (i.e., PMAX) of the UE at a time point when the UL control channel (PUCCH) based (periodic) channel state report operation is omitted. In addition, the present invention may also be effective to transmission of UL control information (UCI) and/or data with high reliability based on a UL data channel (PUSCH) when the sum (i.e., a+b) of a) power required for a UL control channel (PUCCH) based (periodic) change state report and b) power required for transmission of UL control information (UCI) and/or data based on a UL data channel (PUSCH) exceeds maximum transmission power of the UE and is re-calibrated at a time point when the UL control channel (PUCCH) based (periodic) channel state report operation is omitted.

In addition, the aforementioned power controlling method according to the present invention can also be extended to the case in which use of a radio resource on one cell (or component carrier) is dynamically changed and a UL control channel (PUCCH) and a UL data channel (PUSCH) are configured to be simultaneously transmitted under a Non-CA environment. For example, legacy UL power allocation may be configured to be sequentially performed in a priority order of "transmission of UL control channel (PUCCH) based control information→transmission of UL data channel (PUSCH) based UL control information→transmission of UL data channel (PUSCH) based data" (Here, A→B indicates that power allocation is configured to preferentially redistribute A to B. That is, power allocation is configured to preferentially redistribute UL information items (channels) that are positioned in a front part.).

Accordingly, according to the present invention, power required for omitted 'UL control channel (PUCCH) based (periodic) channel state report' may be configured to be sequentially redistributed in a priority order of predefined "transmission of a UL data channel (PUSCH) based UL control information 4 transmission of a UL data channel (PUSCH) based data". Here, when power (i.e., extra power) required for a UL control channel (PUCCH) based (periodic) channel state report is redistributed in a predefined priority order, weights associated with redistribution for each order may be independently (e.g., differently) may be defined.

As another example, redistribution of extra power may be configured to first fill power required for transmission of information configured with high priority and to sequentially fill power required for transmission of information with next priority.

As another example, in one of i) a UE that cannot simultaneously transmit a UL control channel (PUCCH) and a UL data channel (PUSCH) and ii) the case in which a simultaneous transmitting operation of a UL control channel (PUCCH) and a UL data control (PUSCH) is not configured, a UL control channel (PUCCH) based UL control information (UCI) transmitted at the same time as a UL data channel (PUSCH) may be transmitted to a UL data channel (PUSCH) as piggyback. That is, when a time point for dynamic (re)change completion of use of a radio resource and a time point for (re)configuration completion of a channel state estimation process (restricted CSI measurement, and/or interference measurement resource) do not correspond to each other at a time point in which a UL control channel (PUCCH) based UL control information is transmitted to a UL data channel (PUSCH) as piggyback, UL control information transmitted at the corresponding time point may be omitted according to the present invention. In this case, a resource (e.g., RE or RB) on a UL data channel (PUSCH) in which UL control information is transmitted as piggyback may not be mapped to UL data and may be empty via a rate-matching (RM) or puncturing (PC) method according to predefined configuration.

Here, an eNB and a UE may be configured to pre-share or implicitly recognize information about a resource (e.g., RE or RB) on a UL data channel (PUSCH) that is empty via a RM or PC method. Accordingly, the eNB and the UE may transmit/receive UL data in consideration of a position of a resource (e.g., RE or RB) on a corresponding empty UL data channel (PUSCH). For example, transmission power of a resource (e.g., RE or RB) on a UL data channel (PUSCH) that is empty via a RM or PC method may be configured as 0 (zero). Furthermore, transmission power of omitted piggybacked UL control information items may be configured to be redistributed for "UL data channel (PUSCH) based data information transmission".

As another example, when a time point for dynamic (re)change completion of use of a radio resource and a time point for (re)configuration completion of a channel state estimation process (restricted CSI measurement, and/or interference measurement resource) do not correspond to each other at a time point in which UL control information is transmitted to a UL data channel (PUSCH) as piggyback, and accordingly, UL control information transmitted at the corresponding time point may be omitted according to the present invention, transmission power of a resource (e.g., RE or RB) on a UL data channel (PUSCH) in which UL control information is transmitted as piggyback may be configured as 0 (zero) according to a predefined configuration. Here, information about a position of a resource (e.g., RE or RB) on a UL data channel (PUSCH) with transmission power configured as 0 may be pre-shared or may be implicitly recognized between an eNB and a UE, and the eNB and the UE may transmit/receive UL data in consideration of a position of a resource on a corresponding UL data channel (PUSCH). Furthermore, a rule may be configured such that extra power is redistributed for "UL data channel (PUSCH) based data information transmission".

As another example, when a time point for dynamic (re)change completion of use of a radio resource and a time point for (re)configuration completion of a channel state estimation process (restricted CSI measurement, and/or interference measurement resource) do not correspond to each other at a time point in which UL control information is transmitted to a UL data channel as piggyback, and accordingly, UL control information transmitted at the corresponding time point may be omitted according to the present invention, a rule may be configured to transmit UL data information to a resource on a UL data channel in which UL control information is transmitted as piggyback according to predefined configuration.

In addition, the rule may be configured in such a manner that an eNB informs a UE of whether the aforementioned proposed rules are applied and/or information about the aforementioned configurations through a predefined signal (e.g., a physical layer or high layer signal) or that the UE implicitly recognizes these information items based on a predefined rule.

In addition, in order to efficiently apply i) an operation of dynamically changing use of a radio resource, ii) an operation of reporting (a plurality of) restricted CSI measurement result reports, and/or iii) an operation of configuring (a plurality of) channel state estimation processes and reporting results to other transmission modes as well as to a specific transmission mode (e.g., transmission mode 10), it is necessary to further define channel state estimation (and/or interference estimation) related resource/configurations.

For example, configuration for a legacy interference measurement resource (IMR) can be applied only to transmission mode 10, but configuration of interference measurement resources is required for other transmission modes or a different form of configuration of interference measurement resource from interference measurement resource in transmission mode 10 is required for an accurate interference estimation operation (or extraction of an interference estimation value) for separate radio resource sets with different interference characteristics, generated due to dynamic change of use of a radio resource for each eNB.

Accordingly, according to an embodiment of the present invention, in the case of transmission mode 10, a rule may be configured in such a way that an interference measurement resource can be used or is used as default, but in the case of other transmission modes, the rule may be configured in such a way that an interference measurement resource (or an interference measurement resource in transmission mode 10 and other forms of interference measurement resources) can be optionally used according to a predefined rule. Here, when a rule is configured in such a manner that a specific reference signal (e.g., CRS) is not transmitted on a UL resource with changed use, the rule may be configured in such a way that a dynamic changing operation of use of a radio resource is not supported in transmission modes (e.g., transmission mode 4 (a transmit diversity based data transmission scheme)) that require a corresponding reference signal based data information/control information decoding operation.

As another example, when a rule is configured to use a specific reference signal (e.g., DM-RS) for a decoding operation of data information/control information on a UL resource with changed use, the rule may be configured to support a dynamic changing operation of use of a radio resource only in transmission modes in which a data information/control information decoding operation based on a corresponding specific reference signal is possible.

In addition, the rule may be configured in such a way that an eNB notifies a UE information about i) whether embodiments of the present invention is applied, ii) a dynamic changing operation of use of a radio resource, iii) an operation of reporting (a plurality of) restricted CSI measurement results, iv) transmission modes in which operations of configuring (a plurality of) channel state estimation processes and reporting results, v) whether an interference measurement resource can be used (or configured) in specific transmission modes, and/or vi) whether a different form of interference measurement resource from the interference measurement resource in transmission mode 10 can be used (or configured) through a predefined signal (e.g., a physical layer or high layer signal) or that the UE implicitly recognize theses information items based on a predefined rule. In addition, the rule may be configured in such a manner that the UE implicitly recognizes the aforementioned information items according to whether a specific reference signal (e.g., CRS) is transmitted in a corresponding UL subframe with changed use without the aforementioned purpose of additional signal transmission of the eNB.

According to an embodiment of the present invention, when a time point for dynamic (re)change completion of use of a radio resource based on a MAC/physical channel signal and a time point for (re)configuration completion of UL information transmission based on an RRC signal do not correspond to each other due to different signal types, a rule may be configured to determine i) whether UL information items that are (re)configured based on an RRC signal are transmitted, ii) whether some of UL information items that are (re)configured based on an RRC signal are omitted, and/or iii) redistribution of power between transmitted UL information items, according to a predefined configuration. In other words, when a time point for dynamic (re)change completion of use of a radio resource based on a MAC/physical channel signal and a time point for (re)configuration completion of UL information (or channel) transmission based on an RRC signal do not correspond to each other due to different signal types, a rule may be configured to determine i) whether UL channels that are (re)configured based on an RRC signal are transmitted, ii) whether some of UL channels that are (re)configured based on an RRC signal are omitted, and/or iii) redistribution of power between transmitted UL channels, according to a predefined configuration. Here, the UL information items or the UL channels that are (re)configured through an RRC signal may be configured with i) periodic/aperiodic SRS (e.g., transmission period configuration/subframe offset configuration/resource configuration) and/or ii) periodic/aperiodic CSI report (e.g., period report configuration/subframe offset configuration/resource configuration).

This embodiment of the present invention is effective to the case in which UL information items (or channels) that are (re)configured based on an RRC signal cannot appropriately reflect influence of use (and/or a changed interference/channel environment) of a radio resource that is (re)changed through a MAC/physical channel signal due to different signal types.

According to an embodiment of the present invention, when a time point for dynamic (re)change completion of use of a radio resource based on a MAC/physical channel signal and a time point for (re)configuration completion of UL information/channel transmission based on an RRC signal do not correspond to each other, the rule may be configured to omit transmission of all UL information items/channels that are (re)configured based on an RRC signal.

According to another embodiment of the present invention, when a time point for dynamic (re)change completion of use of a radio resource based on a MAC/physical channel signal and a time point for (re)configuration completion of UL information/channel transmission based on an RRC signal do not correspond to each other, the rule may be configured to omit transmission of some of UL information items/channels that are (re)configured based on an RRC signal according to a predefined priority configuration. Here, for example, the corresponding priority configuration may be defined according to "periodic SRS transmission→periodic channel state information (CSI) transmission→aperiodic SRS→aperiodic channel state information (CSI) transmission→UL ACK/NACK information transmission" and may be configured to preferentially omit UL information items/channels that are positioned in a front part (i.e., in the case of A→B, the priority configuration may be configured in such a manner that A is preferentially omitted to B).

According to another embodiment of the present invention, when a time point for dynamic (re)change completion of use of a radio resource based on a MAC/physical channel signal and a time point for (re)configuration completion of UL information (or channel) transmission based on an RRC signal do not correspond to each other, the rule may be configured to redistribute transmission power of UL information items (or channels) that are omitted predefined priority configuration. For example, transmission power of UL information items (or channels) that are omitted according to predefined priority configuration may be configured to be sequentially redistribute based on a priority order of "transmission of UL control channel (PUCCH) based control information→transmission of UL data channel (PUSCH) based control information→transmission of UL data channel (PUSCH) based data" (Here, A→B indicates that power allocation is configured to preferentially redistribute A to B. That is, transmission power is configured to preferentially redistribute UL information items (channels) that are positioned in a front part.).

Furthermore, when transmission power (i.e., extra power) of UL information items (or channels) omitted according to a predefined priority configuration is redistributed according to a priority order, weights associated with redistribution for each order may be independently or differently defined. In addition, redistribution of extra power may be configured to first fill power required for transmission of information (or a channel) configured with high priority and to sequentially fill power required for transmission of information (or a channel) with next priority.

As another example, in the case of a UE that cannot simultaneously transmit a UL control channel (PUCCH) and a UL data channel (PUSCH) or a UE that is not configured with a simultaneous transmission operation of a UL control channel (PUCCH) and a UL data channel (PUSCH), a UL control channel (PUCCH) based UL control information (UCI) transmitted at the same time as a UL data channel (PUSCH) may be transmitted to a UL data channel (PUSCH) as piggyback. That is, when a time point for (re)configuration completion of use of a radio resource based on a MAC/physical channel signal and a time point for (re)configuration completion of transmission of UL information (or a channel) based on an RRC signal do not correspond to each other at a time point in which a UL control channel (PUCCH) based UL control information is transmitted to a UL data channel (PUSCH) as piggyback, UL information items (or channels) that are (re)configured based on an RRC signal transmitted at the corresponding time point are omitted according to the present invention, and in this case, a resource (e.g., RE or RB) on a UL data channel (PUSCH) in which UL control information (or a channel) is transmitted as piggyback may not be mapped to UL data and may be empty via a rate-matching (RM) or puncturing (PC) method according to predefined configuration.

Here, an eNB and a UE may be configured to pre-share or implicitly recognize information about a resource (e.g., RE or RB) on a UL data channel (PUSCH) that is empty via a RM or PC method, and the eNB and the UE may transmit/receive UL data in consideration of a position of a resource (e.g., RE or RB) on a corresponding empty UL data channel (PUSCH). For example, transmission power of a resource (e.g., RE or RB) on a UL data channel (PUSCH) that is empty via a RM or PC method may be configured as 0 (zero). Here, transmission power of omitted piggybacked UL control information items/channels may be configured to be redistributed for "UL data channel (PUSCH) based data information transmission".

As another example, when a time point for dynamic (re)change completion of use of a radio resource based on a MAC/physical channel signal and a time point for (re)configuration completion of UL information/channel transmission based on an RRC signal do not correspond to each other at a time point in which a UL control channel (PUCCH) based UL control information is transmitted to a UL data channel (PUSCH) as piggyback, and accordingly, UL control information items/channels that are (re)configured based a RRC signal, transmitted at the corresponding time point, may be omitted according to the present invention, transmission power of a resource (e.g., RE or RB) on a UL data channel (PUSCH) in which UL control information is transmitted as piggyback may be configured as 0 (zero) according to a predefined configuration. Here, information about a position of a resource (e.g., RE or RB) on a UL data channel (PUSCH) with transmission power configured as 0 may be pre-shared or may be implicitly recognized between an eNB and a UE, and the eNB and the UE may transmit/receive UL data in consideration of a position of a resource on a corresponding UL data channel (PUSCH).

Furthermore, a rule may be configured such that extra power is redistributed for "UL data channel (PUSCH) based data information transmission".

As another example, when a time point for dynamic (re)change completion of use of a radio resource based on a MAC/physical channel signal and a time point for (re) configuration completion of UL information/channel transmission based on an RRC signal do not correspond to each other at a time point in which a UL control channel based UL control information is transmitted to a UL data channel as piggyback, and accordingly, UL control information items/ channels that are (re)configured based a RRC signal, transmitted at the corresponding time point, may be omitted according to the present invention, a rule may be configured to transmit UL data information to a resource on an UL data channel in which UL control information is transmitted as piggyback according to a predefined configuration.

In addition, the aforementioned proposed methods can also be extended to the case in which use of a radio resource on one cell (or component carrier) is dynamically changed and a UL control channel (PUCCH) and a UL data channel (PUSCH) are configured to be simultaneously transmitted under a CA environment or a Non-CA environment. Furthermore, an eNB may notify a UE of information about whether the configuration proposed by the present invention are applied and/or information about the configurations proposed by the present invention through a predefined signal (e.g., a physical layer or high layer signal) or the UE may be configured to implicitly recognize the these information items based on a predefined rule.

Figure 16:
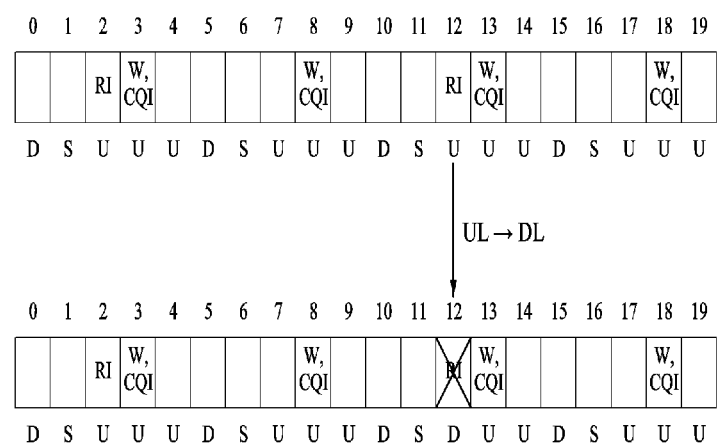

Embodiments of the present invention can be used in a method for overcoming an ambiguity issue due to mismatch between time points for completion of signaling of resources for interference measurement and/or signal measurement or a dynamic changing operation of a resource for channel state information (CSI) report like in FIG. 16.

In FIG. 16, it is assumed that C_SF (i.e., a subframe (set), use of which can be changed) is defined for UL use in a SIB and RI information report is performed in the corresponding subframe. Here, when the aforementioned C_SF is changed to DL use due to necessity of a network (e.g., increase in DL load), it is necessary to clearly configure how RI information to be reported in a corresponding subframe is transmitted or whether the RI information is reported and how PMI information/CQI information determined and reported based on the corresponding RI information is processed. In addition, in FIG. 16, it is assumed that the RI information an interval or period of 10 subframes (i.e., 10 ms) based on a UL subframe, W (i.e., PMI information)/CQI information has an interval or period of 5 subframes (i.e., 5 ms), and a subframe in which the W (i.e., PMI information)/CQI information and the RI information 9 are reported has offset of −1. Hereinafter, according to the present invention, W may be interpreted as indicating at least one of broadband PMI and subband PMI, and the CQI information may also be interpreted as indicating at least one of broadband CQI and subband CQI. As seen from FIG. 16, use of subframe #12 is changed to a DL subframe from a UL subframe such that additional configuration about how RI information transmitted in the corresponding subframe #12 is processed is required.

Like in FIG. 16, when use of a resource (or a subframe) for channel state information (CSI) report is changed, the aforementioned proposed methods can be (re)applied as follows, and FIG. 17 illustrates an embodiment of the aforementioned methods. Here, the following description is purely exemplary, and the aforementioned proposed features according to the present invention can be extended.

In addition, the following technical features according to the present invention are particularly effective to the case in which a subframe with changed use to DL from UL, is a subframe predicted (or configured) to report RI information. For example, when a UL subframe in which PMI information/CQI information and so on are reported is changed to DL use, corresponding PMI information/CQI information report may be omitted. In addition, in a subframe in which RI information is reported, as necessary (e.g., 8 Tx), information such as W1 (long-term PMI), PTI, etc. may be encoded, and in this case, this may be included an embodiment that will be described with reference to FIGS. 17 and 18.

- Like in FIG. 17(A), RI information may be assumed to be a predefined fixed value (e.g., 1) and PMI information/ CQI information based on the RI information may also be reported as a fixed value. Here, this operation may be performed by omitting channel state information report of PMI information/CQI information report period (or period until use is re-changed to UL) based on the fixed RI value. That is, when a DL subframe is re-changed to a UL subframe, channel state information report may be performed using a conventional method from RI information report that is first generated from a time point for re-changing or channel state information report may be performed using a conventional method from a time point of RI information report corresponding to a channel state information (CSI) reference resource that is present from the first.
- Like in FIG. 17(B), PMI information/CQI information and so on may be calculated and reported based on RI information prior to change in use. When a DL subframe is re-changed to a UL subframe, channel state information report may be performed using a conventional method from RI information report that is first generated from a time point for re-changing or channel state information report may be performed using a conventional method from a time point of RI information report corresponding to a channel state information (CSI) reference resource that is present from the first.
- Like in FIG. 17(C), a UL subframe index may be re-indexed and a time point for channel state information report may be calculated using only an actually available UL subframe among the re-indexed UL subframes. For example, a time point for reporting RI information may be moved to a first available subframe after the time point for reporting the RI information. Furthermore, offset such as RI information and PMI information/CQI information may be applied with an available subframe as a start point.
- Like in FIG. 18, only available UL subframes may be re-indexed to calculate a time point for reporting channel state information such as RI information, PMI information, and CQI information. For example, an index of a subframe with changed use to a DL subframe from a UL subframe, may be re-indexed on a first available UL subframe to readjust the time point for reporting the channel state information such as RI information, and PMI information/ CQI information. In addition, a DL subframe is (re)changed to a UL subframe, re-indexing may be re-performed to readjust the time point for reporting channel state information. Here, the re-indexing operation may be configured to be sequentially performed to skip a subframe with changed use (e.g., a subframe with changed use to DL from UL) (i.e., FIG. 18(A)) or to perform re-indexing after a subframe with changed use (e.g., a subframe with changed use to DL from UL) from the first (i.e., FIG. 18(B)).

The present invention further proposes an embodiment in which a subframe with changed use is excluded from a corresponding averaged period (e.g., an average time domain window) and channel state information (CSI) is calculated and reported using the remaining available signal/ interference measurement resources belonging to the corresponding period (i.e., average time domain window) when a Dl subframe used for signal measurement and/or interference measurement is changed for a UL subframe and a UE averages a predefined period (e.g., an average time domain window) and measures a signal and/or interference. Here, when a signal and/or interference is measured using only singles/interference measurement resources belonging to one (DL) subframe, this may be interpreted as if report (associated with the corresponding signal/interference measurement) is omitted or a predefined fixed value is reported.

The present invention proposes an operation associated with the further proposed channel state information (CSI) report when use of a subframe including an interference measurement resource (IMR) is changed. That is, in the case of periodic channel state report, when use of a specific subframe is changed (e.g., the subframe is changed to use of UL from DL.) and an interference measurement resource is included or configured in the corresponding specific subframe, i) channel state information report using an interference amount (or an interference value) calculated from the corresponding interference measurement resource may be omitted or ii) may be fixed to a predefined specific value, or iii) channel state information report may be performed based on another available interference measurement resource. Here, when the channel state information report is omitted or fixed to a specific value, at least one of [RI, W1 (long-term PMI), PTI] and [CQI, PMI], which are deduced based on a subframe with changed use and which is reported at different time points (or UL subframes) or an interference measurement resource in the corresponding subframe with changed use, may be omitted in periodic channel state information report. For example, RI may be configured to be omitted or fixed to a specific value and CQI/PMI may also be configured to be omitted or fixed to a specific value.

In addition, when the corresponding channel state information report is performed using another interference measurement resource, the interference measurement resource may be determined. Here, the interference measurement resource may be included in a corresponding channel state estimation process (CSI process). For example, interference measurement may be performed using a subframe including an actually available interference measurement resource that is close to a subframe with changed use, in terms of time among subframes prior to the subframe with changed use, and channel state information may be reported based on the interference measurement. Here, the subframe in which interference measurement is performed may be an actually available subframe (including an interference measurement resource) prior to (predefined) specific time (e.g., 4 ms) from a channel state information reporting time point. In this case, there is a problem in that an accurate channel situation (and/or an interference situation) cannot be ensured when a subframe including an actually available interference measurement resource is apart from a subframe with changed use in terms of time.

Accordingly, a time window in which channel situations and/or interference situations are assumed to be similar may be configured in a time domain, interference may be measured, and the interference may be reflected to channel state information report using a subframe including an actually available interference measurement resource belonging to the corresponding time window from the subframe with changed use. Here, when an available subframe for inter-ference measurement is not present or a valid interference measurement resource is not present in the corresponding time window, channel state report may be omitted or channel state report fixed to a specific value may be performed, as described above.

The aforementioned periodic channel state information reporting method may also be applied to aperiodic channel information report. In this case, similarly, when channel state information report is omitted, power to be used in the corresponding channel state information report may be configured as 0 and corresponding extra power may be used to transmit a UL data channel (PUSCH). Alternatively, a resource to be used in (aperiodic/periodic) channel state report on a UL data channel may be (re)used to transmit UL data.

The present invention further proposes a method for determining validity of a resource in which interference/ signal measurement is to be performed.

For example, at least one of CSI-RS configuration associated information for channel state information (CSI) report of a UE, IMR configuration associated information, channel state estimation process (CSI process) information, or restricted CSI measurement information may be indicated to the UE by an eNB using an RRC signal. On the other hand, dynamic change of use of a radio resource may be based on a predefined MAC signal or a physical channel signal (e.g., DCI transmitted on a PDCCH or an EPDCCH). In this case, one interference/signal measurement associated information item (e.g., measurement configuration information) may be RRC-signaled and uses of a plurality of subframes may be changed during a time period until the corresponding measurement associated information is (re)configured. That is, use of a subframe determined as an interference/signal measurement resource via RRC signaling may be changed, which may cause confusion in channel state information report.

Accordingly, according to the present invention, assuming that the corresponding signal is actually applied after a predetermined number of subframes from a subframe in which the corresponding signal is received, a UE that receives a MAC signal (or a physical channel signal) for changing use of a subframe may determine validity of an interference/signal measurement resource based on this assumption. For example, when a signal for changing use of a subframe is received in SF #n, the corresponding signal may be assumed to be actually applied in SF #(n+8), validity of an interference/signal measurement resource may be determined based on the assumption.

Here, an interference/signal measurement subframe (or a measurement resource) present in a period (hereinafter, "transient period") between a subframe in which a signal for changing use of a subframe is received and a subframe to which the corresponding signal is actually applied (i.e., interference/signal measurement may be performed on a specific resource (e.g., CSI-RS, and IMR) in a corresponding subframe) may be assumed as follows. That is, in the present invention, the 'transient period" refers to a period up to a time point in which corresponding subframe use changing/re-changing information (e.g., message) is actually applied from a time point in which information (e.g., message) for subframe use changing/re-changing is received. Hereinafter, for convenience of description, the 'transient period' is assumed as SF #n to SF #(n+7). That is, when a signal (e.g., a MAC signal or a physical channel signal) for changing use of a subframe is received in SF #n, the corresponding signal (or content of the corresponding signal) is assumed to be actually applied from SF #(n+8).

When a DL subframe is changed to a UL subframe
  when an interference/signal measurement resource for specific channel state information report is present in or prior to the 'transient period', channel state information report corresponding to the interference/signal measurement resource may be assumed to be valid, and channel state information deduced through a corresponding interference/signal measurement resource may be reported.
  when an interference/signal measurement resource for specific channel information report is present after the 'transient period' and use of a subframe including the corresponding interference/signal measurement resource is changed to UL from DL, the corresponding interference/signal measurement resource may be assumed not to be valid, and channel state information report may be omitted or channel state information report may be performed based on a predefined specific value (e.g., channel state information calculated according to interference/signal measurement value deduced from a predefined value or a latest valid (interference/signal) measurement resource).

When a UL subframe is changed to a DL subframe
  In general, when a UL subframe is changed to a DL subframe, there is no ambiguity for an interference/signal measurement resource, and thus special assumption is not required. However, when the corresponding UL subframe (i.e., a subframe changed to use of DL from UL) is determined to be a channel state information reporting time point instead of use of interference/signal measurement, corresponding channel state information report may be omitted after the 'transient period' and the corresponding channel state information report may be performed in the 'transient period' like in the aforementioned case (i.e., when a DL subframe is changed to a UL subframe).
  On the other hand, when use of a subframe is frequently changed through a MAC signal (or a physical channel signal) while RRC signaling indicating an interference/signal measurement resource (and/or configuration information for channel state information report) is not (re)configured, a subframe including an (interference/signal) measurement resource is changed to a UL subframe (i.e., a first transient period) and is re-changed to a DL subframe (i.e., a second transient period). Here, when use of a subframe including an interference/signal measurement resource is changed, whether a corresponding subframe is valid for use of interference/signal measurement may be determined for each (time) domain (or according to a predefined rule).

Figure 19:
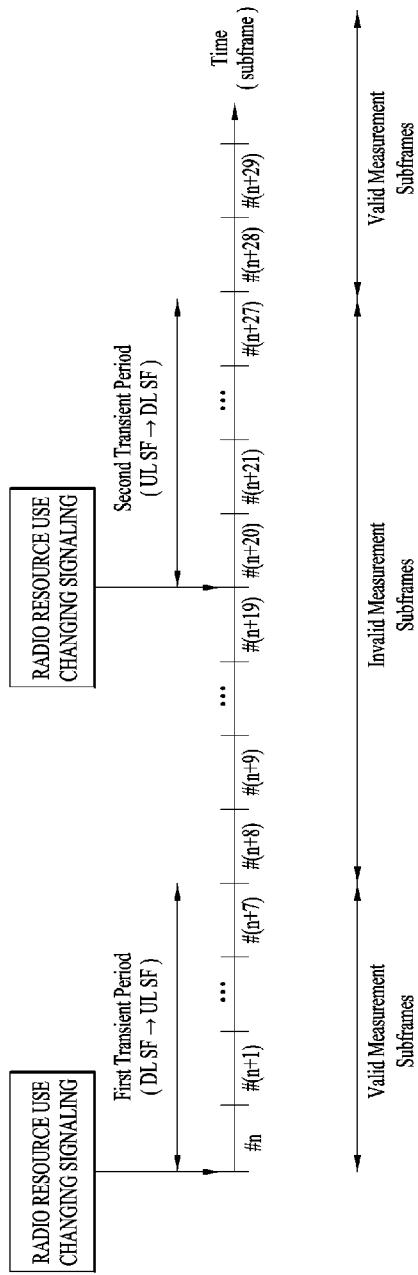
FIG. 19 is a diagram illustrating determination of validity of a resource for interference measurement according to an embodiment of the present invention.

FIG. 19 is a diagram illustrating an embodiment of the present invention. FIG. 19 shows a time point when an interference/signal measurement resource configured in a corresponding subframe is valid from a point of view of change in use of one specific subframe. In addition, signaling for changing use of a radio resource is assumed to be transmitted/received based on a predefined period (i.e., 20 ms). As seen from FIG. 19, an interference/signal measurement resource is configured via RRC signaling in an invalid interference/signal measurement subframe and the corresponding subframe cannot be used for interference/signal measurement when change in use of the corresponding subframe is indicated via a MAC signal (or a physical channel signal).

In addition, in FIG. 19, even if a corresponding subframe belongs to an invalid interference/signal measurement subframe region, when use of the corresponding subframe is not changed to UL from DL, the corresponding subframe may be used for interference/signal measurement. For example, whether subframe configured for DL through an SIB and including an interference/signal measurement resource via RRC signaling is used for interference/signal measurement may be determined according to a subframe time point to which a MAC signal/physical signal and a MAC signal/physical channel signal, for changing use of the corresponding subframe is changed to UL from DL, are (actually) applied or according to a subframe time point to which a physical channel signal and a physical channel signal are (actually) applied.

Alternatively, according to the present invention, when the UE performs channel state information (CSI) report in SF #n, if a previously present initial interference/signal measurement resource (or a channel state information (CSI) reference resource) including SF #(n-k) (e.g., 'k=4') is invalid (e.g., use is changed to UL from DL), interference/signal measurement may not be performed in the corresponding subframe. For example, channel state information report deduced by the corresponding invalid interference/signal measurement resource (or a channel state information reference resource) may be omitted. Alternatively, one of latest (or previously) reported (valid) channel state information and channel state information calculated according to a predefined specific value or an interference/signal measurement value deduced from a latest valid (interference/signal) measurement resource may be transmitted.

The aforementioned embodiments of the present invention is used to determine whether an interference/signal measurement resource for specific channel state report is valid for use of interference/signal measurement under an environment in which change in use of a subframe is indicated by a MAC signal or a physical channel signal. Accordingly, embodiments of the present invention may be (re)applied to each channel state information report (e.g., RI, CQI, PMI (W1 (Long-Term PMI), W2 (Short-Term PMI)), etc.) for corresponding interference/signal measurement resource. In addition, when an interference/signal measurement resource is invalid, interference/signal measurement is not performed, and channel state information report corresponding to the corresponding interference/signal measurement resource may be configured to be omitted or may be configured in such a manner that latest (or previously) reported (valid) channel state information and channel state information calculated according to a predefined specific value or an interference/signal measurement value deduced from a latest valid interference/signal measurement resource may be transmitted.

According to the aforementioned embodiments of the present invention, when interference measurement resources (IMRs) on a predefined interference average time domain window is averaged to deduce an interference amount, a channel state information (CSI) report (and/or channel state estimation process) associated interference measurement resource may be configured to be determined to be invalid only when all (DL) subframes including an interference measurement resource are changed to use of UL in a window in which the corresponding interference averaging operation is performed. For example, channel state report (and/or a channel state estimation process) as well as an interference measurement resource may be determined to be invalid. This embodiment of the present invention can be extended to the situation in which all (DL) subframes including a resource for use of signal measurement in a corresponding window is changed to use of UL when a signal measurement value is deduced using a resource (e.g., a specific reference signal (e.g., CRS and CSI-RS) on a DL subframe) for use of signal measurement in a predefined period (a time domain window) or a signal measurement value is deduced by averaging resources for use of signal measurement on a predefined period (signal average time domain window).

In addition, according to the present invention, valid channel state information (CSI) reference resource may be configured to be differently determined according to a type of channel state information report. For example, in the case of periodic channel state information report, a valid channel state information reference resource may be configured to be defined or limited as DL subframes on SIB information or DL subframes on UL-DL configuration associated with a representative DL HARQ timeline (or a representative UL HARQ timeline).

That is, in the case of periodic channel state information report, DL subframes on UL-DL configuration (e.g., UL-DL configuration on a SIB or UL-DL configuration associated with representative DL HARQ timeline (or a representative UL HARQ timeline)) that is emulated to be relatively (semi)static or DL subframes on a DL HARQ timeline associated with the corresponding UL-DL configuration may be emulated as valid channel state information reference resources. Similarly, in the case of periodic channel state information report, DL subframes on UL-DL configuration emulated not to be changed during a relatively long term or DL subframes on a DL HARQ timeline associated with the corresponding UL-DL configuration may be emulated as valid channel state information reference resources.

Here, when the present invention is applied, periodic channel state information report may be configured mainly for channel state information report for a (semi)static subframe (a subframe, use of which is not changed). Alternatively, positions of valid channel state information reference resources for periodic channel state information report may not be relatively affected by or may be independent from an operation of dynamic changing use of a radio resource.

In addition, for periodic channel state information report, the present invention is effective to maintain implementation of a UE or consistency of channel state information report. For example, when periodic channel state information related RI information and PMI information/CQI information are configured to be reported at different time points, a valid channel state information reference resource associated with RI information is determined as a (semi)static DL subframe (of subframe use of which is not changed) and a valid channel state information reference resource associated with PMI information/CQI information is determined as a DL subframe (e.g., C_SF or flexible subframe) with changed use, and thus consistency of periodic channel state information report is not maintained. In this regard, the present invention can overcome this problem.

In the case of periodic channel state information report, a valid channel state information reference resource may be configured to be defined or limited as subframes that are currently configured for use of DL among DL subframes on SIB information or subframes that are currently configured for use of DL among DL subframes on UL-DL configuration associated with a representative DL HARQ timeline (or a representative UL HARQ timeline).

As another example, in the case of aperiodic channel state information report, a valid channel state information reference resource may be configured to be defined or limited as DL subframes on a dynamic changing message (reconfiguration message) of use of a radio resource. That is, when a subframe (e.g., C_SF or flexible subframe) with changed use is (re)configured to use of DL according to a dynamic changing message for use of a radio resource, the subframe may be emulated as a valid channel state information reference resource.

As another example, according to i) a channel state estimation process (CSI process), ii) restricted CSI measurement (or resource-specific CSI measurement) associated with subframe set, and/or iii) a type of channel state information report (e.g., periodic channel state information report and aperiodic channel state information report), UL-DL configuration may be configured to be independently (or differently) determined for a DL subframe in which at least one of a valid channel state information (CSI) reference resource and a valid interference measurement resource (IMR) is defined.

In an environment in which a carrier aggregation scheme is applied, i) CSI process number configuration, ii) restricted CSI measurement (or resource-specific CSI measurement) related subframe set configuration information (e.g., a position of a subframe included in a specific subframe set), and/or iii) interference measurement resource (IMR) configuration information of SCell (or scheduled cell) (configured in a dynamic changing mode of use of a radio resource) may be configured to be assumed to the same as configuration information of PCell (or scheduling cell) (configured in a dynamic changing mode of use of a radio resource).

For example, when this embodiment is applied, an eNB may notify a UE of only i) CSI process number configuration, ii) restricted CSI measurement (or resource-specific CSI measurement) related subframe set configuration information (e.g., a position of a subframe included in a specific set), and/or iii) interference measurement resource (IMR) configuration information of PCell (or scheduling cell) (configured in a dynamic changing mode of use of a radio resource) through a predefined signal (e.g., a RRC signal), and a UE that receives information associated with PCell (or scheduling cell) (configured in a dynamic changing mode of use of a radio resource) can be applied to SCell (or scheduled cell) (configured in a dynamic changing mode of use of a radio resource) in the same way.

In addition, in an environment in which a carrier aggregation scheme is applied, UL subframe set configuration information (e.g., a position of a UL subframe included in a specific UL subframe set) associated with subframe-set dependent uplink power control of SCell (or scheduled cell) (configured in a dynamic changing mode of use of a radio resource) may be configured to be assumed to be the same as configuration information of PCell (or scheduling cell) (configured in a dynamic changing mode of use of a radio resource). For example, an eNB may notify a UE of only UL subframe set configuration information (e.g., a position of a UL subframe included in a specific UL subframe set) associated with subframe-set dependent uplink power control of PCell (or scheduling cell) (configured in a dynamic changing mode of use of a radio resource) through a predefined signal (e.g., RRC signal), and a UE that receives the information associated with PCell (or scheduling cell) (configured in a dynamic changing mode of use of a radio resource)

can be applied to SCell (or scheduled cell) (configured in a dynamic changing mode of use of a radio resource) in the same way.

In addition, UEs in an IDLE mode may be configured to perform i) a RRM/RLM/CSI measurement operation, ii) an operation of receiving use changing information associated with a specific cell, iii) an operation of receiving a use changing indicator, and/or iv) an operation of receiving a random assess related message on a specific cell only in predefined specific DL subframes (e.g., a UL subframe set (e.g., SF #0, #1, #5, and #6), use of which cannot be changed to transmission of PSS/SSS/PBCH/PAGING/SIB).

UEs in an IDLE mode may be configured to perform i) a RRM/RLM/CSI measurement operation, ii) an operation of receiving use changing information associated with a specific cell, iii) an operation of receiving a use changing indicator, and/or iv) an operation of receiving a random assess related message on a specific cell on a specific cell based on UL-DL configuration on a SIB.

Even if a UE in an IDLE mode enters a specific cell of RRC CONNECTED mode, when the UE does not (independently) receive use changing information or use changing indicator from a corresponding cell, the UE may be configured to also perform a control information ((E)PDCCH)) related monitoring (blind decoding) operation or a data (PDSCH) operation only in i) predefined specific DL subframes (e.g., a DL subframe set (e.g., SF #0, #1, #5, and #6)), use of which cannot be changed to transmission of PSS/SSS/PBCH, ii) DL subframes on an SIB, or iii) DL subframes on SIB information based UL-DL configuration. Here, when the present invention is applied, an eNB and a UE may be configured to assume a predefined DL/UL HARQ timeline or an SIB information based DL/UL HARQ timeline.

The aforementioned embodiments of the present invention may be configured to be limited only to the case in which a dynamic changing mode of use of a radio resource is configured. In addition, the aforementioned embodiments of the present invention can be extended to the case in which radio resource use changing information is configured to be transmitted through a predefined system information transmission channel (e.g., SIB, PBCH (MIB), and PAGING) as well as a MAC signal or a physical channel signal.

A plurality of example of the aforementioned proposed methods according to the present invention may also be included in methods according to embodiments of the present invention, and thus it would be obvious that the examples are considered as proposed methods. In addition, the aforementioned proposed methods may be independently embodied, but the present invention may be embodied in a combination (or aggregation) of the methods.

The aforementioned embodiments of the present invention may be configured to be limited only to the case in which i) a predefined number of channel state estimation processes are configured, ii) restricted CSI measurement (or resource-specific CSI measurement) is configured, iii) a type of specific channel state information report (e.g., periodic channel state information report and aperiodic channel state information report) is configured, iv) a specific transmission mode (TM) is configured, and/or v) specific UL-DL configuration is configured.

Figure 20:
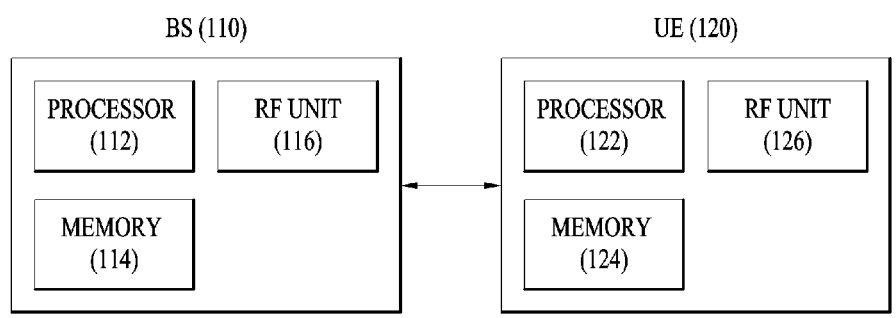
FIG. 20 is a block diagram of an example of a based station and a user equipment to which an embodiment of the present invention is applicable.

FIG. 20 is a block diagram of an example of a BS 110 and a UE 120 to which an embodiment of the present invention is applicable. When a relay is included in a wireless communication system, communication in a backhaul link is performed between an eNB and a relay and communication in an access link is performed between the relay and a UE. Accordingly, the illustrated BS or UE may be replaced with a relay according to a situation.

Referring to FIG. 20, the wireless communication system includes the BS 110 and the UE 120. The BS 110 includes a processor 112, a memory 114, and a radio frequency (RF) unit 116. The processor 112 may be configured to embody the procedure and/or methods proposed according to the present invention. The memory 114 is connected to the processor 112 and stores various information items associated with an operation of the processor 112. The RF unit 116 is connected to the processor 112 and transmits and/or receives a radio signal. The UE 120 includes a processor 122, a memory 124, and an RF unit 126. The processor 122 may be configured to embody the procedure and/or methods proposed according to the present invention. The memory 124 is connected to the processor 122 and stores various information items associated with an operation of the processor 122. The RF unit 126 is connected to the processor 122 and transmits and/or receives a radio signal. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method and apparatus for sharing radio resource information in a multi-cell wireless communication system to a 3$^{rd}$ generation partnership project (3GPP) long term evolution (LTE) system has been described, the present invention is applicable to various wireless communication systems in addition to the 3GPP LTE system.

The invention claimed is:

1. A method for reporting channel state information (CSI) by a user equipment (UE) in a multi-cell wireless communication system, the method comprising:
receiving a configuration for reporting CSI including information of interference measurement resources (IMRs) associated with at least one CSI process, via high layer signaling from a serving cell; and
reporting the CSI corresponding to a specific CSI process configured by high layers among the at least one CSI process based on the configuration for reporting CSI, when a CSI reference resource associated with the specific CSI process is valid,
wherein the CSI is reported based on resource-restricted CSI measurements, if two subframe sets for CSI measurement are configured by the configuration for reporting CSI, and
wherein interference measurement for the CSI is configured to be derived using an IMR among the IMRs associated with one of the two subframe sets, which belong to the CSI reference resource, for the specific process,
wherein when the CSI reference resource associated with the specific CSI process is not valid, the reporting the CSI is omitted.

2. The method according to claim 1, wherein the CSI includes at least one of a rank indicator, a channel quality indicator, and a precoding matrix index.

3. A user equipment (UE) for reporting channel state information (CSI) in a multi-cell wireless communication system, the UE comprising:
a radio frequency (RF) transceiver; and
a processor configured to:
control the RF transceiver to receive a configuration for reporting CSI including information of interference measurement resources (IMRs) associated with at least one CSI process, via high layer signaling from a serving cell, and
control the RF transceiver to report the CSI corresponding to a specific CSI process configured by high layers among the at least one CSI process based on the configuration for reporting CSI when a CSI reference resource associated with the specific CSI process is valid,
wherein the CSI is reported based on resource-restricted CSI measurements, if two subframe sets for CSI measurement are configured by the configuration for reporting CSI, and
wherein interference measurement for the CSI is configured to be derived using an IMR among the IMRs associated with one of the two subframe sets, which belong to the CSI reference resource, for the specific process,
wherein when the CSI reference resource associated with the Specific CSI process is not valid, the reporting the CSI by the RF transceiver is omitted.

4. The method according to claim 1, wherein each of the at least one CSI process is associated with a CSI-reference signal (CSI-RS) resource and at least one IMR.

5. The method according to claim 1, wherein the UE is configured with up to two IMRs for each CSI process of the at least one CSI process, if the UE is configured with the two subframe sets for CSI measurement.

6. The method according to claim 1, wherein the CSI is reported periodically or aperiodically by the high layer signaling.

* * * * *